United States Patent
Fitzpatrick et al.

(10) Patent No.: US 11,829,751 B1
(45) Date of Patent: Nov. 28, 2023

(54) SYSTEM AND METHOD FOR AUTOMATICALLY CAPTURING SOURCE CODE AND ASSOCIATED ARTIFACTS FOR STATIC ANALYSIS

(71) Applicant: Synopsys, Inc., Mountain View, CA (US)

(72) Inventors: John Liam Fitzpatrick, Calgary (CA); Thierry M. Lavoie, Calgary (CA)

(73) Assignee: Synopsys, Inc., Sunnyvale, CA (US)

(*) Notice: Subject to any disclaimer, the term of this patent is extended or adjusted under 35 U.S.C. 154(b) by 0 days.

(21) Appl. No.: 17/558,242

(22) Filed: Dec. 21, 2021

Related U.S. Application Data

(60) Provisional application No. 63/130,238, filed on Dec. 23, 2020.

(51) Int. Cl.
    *G06F 8/75* (2018.01)
    *G06F 8/74* (2018.01)
    *G06F 8/34* (2018.01)
    *G06F 8/41* (2018.01)
    *G06F 8/71* (2018.01)

(52) U.S. Cl.
    CPC .......... *G06F 8/75* (2013.01); *G06F 8/34* (2013.01); *G06F 8/433* (2013.01); *G06F 8/71* (2013.01); *G06F 8/74* (2013.01)

(58) Field of Classification Search
    CPC .......... G06F 8/34; G06F 8/40–49; G06F 8/70; G06F 8/71; G06F 8/74
    USPC .................................. 717/120–123, 136–161
    See application file for complete search history.

(56) References Cited

U.S. PATENT DOCUMENTS

| | | | | |
|---|---|---|---|---|
| 10,564,945 B2* | 2/2020 | Dong | .......... | G06F 8/42 |
| 11,200,038 B1* | 12/2021 | Hoffman | .......... | G06F 8/65 |
| 11,474,796 B1* | 10/2022 | Mather | .......... | G06F 8/77 |
| 2013/0212567 A1* | 8/2013 | Fisher | .......... | G06F 8/41 |
| | | | | 717/140 |

FOREIGN PATENT DOCUMENTS

EP    0496494 A2 *  7/1992  .............. G06F 8/24

OTHER PUBLICATIONS

Zampetti, Fiorella, et al., How Open Source Projects use Static Code AnalysisTools in Continuous Integration Pipelines, MSR '17: Proceedings of the 14th International Conference on Mining Software Repositories, May 2017, 11 pages, [retrieved on Jun. 30, 2023], Retrieved from the Internet: <URL:http://dl.acm.org/>.*

(Continued)

*Primary Examiner* — Geoffrey R St Leger
(74) *Attorney, Agent, or Firm* — Lowenstein Sandler LLP

(57) ABSTRACT

This disclosure describes a system and method of automatically capturing source code and associated artifacts for static analysis. A method includes receiving a current state of a project that includes a set of files in a directory to be captured for analysis and a current capture status of individual files of the set of files, determining a plan including a sequence of actions in response to the current state of the project, and executing the sequence of actions to capture each of the set of files. The sequence of actions includes capturing buildable modules in the set of files with a build-capture based on a default build command and a buildless-capture based on module definition files.

20 Claims, 17 Drawing Sheets

(56) References Cited

OTHER PUBLICATIONS

Nachtigall, Marcus, et al., Explaining Static Analysis—A Perspective, 34th IEEE/ACM International Conference on Automated Software Engineering Workshop (ASEW), 2019, 4 pages, [retrieved on Jun. 30, 2023], Retrieved from the Internet: <URL:http://ieeexplore.ieee.org/>.*

* cited by examiner

SYSTEM AND METHOD FOR AUTOMATICALLY CAPTURING SOURCE CODE AND ASSOCIATED ARTIFACTS FOR STATIC ANALYSIS

CROSS-REFERENCE TO RELATED APPLICATIONS

The present application claims the benefit of U.S. Provisional Patent Application No. 63/130,238, titled "System and Method for Automatically Capturing Source Code and Associated Artifacts for Static Analysis," filed on Dec. 23, 2020, which is incorporated by reference in its entirety for all purposes.

TECHNICAL FIELD

The present disclosure generally relates to a static analysis system for computer source code. In particular, the present disclosure relates to a system and method for automatically capturing source code and associated artifacts for static analysis.

BACKGROUND

Static analysis is an approach to finding defects in computer source code by evaluating the source code. Static analysis can look for paths through the program of the computer source code to see if any of the paths lead to a condition that will cause a crash of the program or result in unintended behaviors. Example defects found by static analysis include null pointer dereferences and lock evasions. A null pointer dereference occurs when a pointer type variable in the computer source code is assigned a null value but is dereferenced. The deference refers to an attempt to read the value stored at the address, which is the null value, pointed to by the pointer variable. The null pointer deference can result in abnormal termination of the program, which can be referred to as a crash. Lock evasion can occur in a multi-threaded program where data is shared between multiple threads of the program. For example, lock evasion occurs when a user reads or writes data without the user first obtaining a lock of the data prior to the read or write operation of the data in the multi-threaded program.

Static analysis of a program is performed without executing the program (as opposed to dynamic analysis where the program is executed). Some static analysis systems can analyze source code of the program by translating the source code into an abstract syntax tree (AST) and traversing the AST. An AST is a representation of the program in a tree-based data-structure. The process of obtaining the AST or the tree-based graph representation of the program for static analysis can be referred to as a capture process. In the capture process, the static analysis system can identify a set of source files and invoke a specific compiler on the set of source files to generate ASTs representing the source files. The process of translating the set of source files to generate ASTs can be referred to as an emit process. Compared to the emit process, the capture process can additionally include identifying an appropriate compiler and determining the arguments to invoke the compiler. Some static analysis systems can analyze program build outputs, for example, Java Archives (JARs), WINDOWS™ dynamic link library (DLL), or executable binary files with filename extensions such as .exe and .elf. These static analysis systems can decompile the program build outputs to produce a representation of the program similar to an AST and analyze the resulting representation of the program.

The approach of analyzing source code and build outputs of a program can apply to compiled languages and non-compiled languages. Compiled language can refer to a programming language where the source code of the program needs to be compiled before executing the program, for example, C, C++, and C#. A compiler can be invoked to compile the source code of a compiled language (also referred to as compiled source files) and generate binary files, which can be directly executed by an operating system. The binary files can also be referred to as artifacts. Non-compiled language can refer to a programming language where the source code of the program may not be compiled before executing the program, for example, JavaScript and Python. The non-compiled languages can also be referred to as interpreted languages. The source code of a non-compiled language (also referred to as non-compiled source files) can be translated and executed by an interpreter at runtime. Since non-compiled languages may require no compilation in advance, the source code of the program using non-compiled languages can be converted into an AST by translating them with an appropriate compiler. A project can include a mixture of both compiled languages and non-compiled languages.

SUMMARY

This disclosure describes a method for automatically capturing source code and associated artifacts for static analysis. The method includes determining a current state of a project. The current state of the project includes a set of files in a directory to be translated into tree-based graph representations through a capture process for static analysis and current capture status for individual files of the set of file. The individual files includes buildable modules that generates build outputs through a build process with a build command. The method further includes determining, based on the current capture status, a sequence of actions for one or more of the individual files in the set of files with the current capture status indicating not captured. The sequence of actions includes translating the buildable modules in the one or more of the individual files into the tree-based graph representations with a build-capture based on an inferred build command. The method further includes executing the sequence of actions to capture the one or more of the individual files.

This disclosure also describes a system to automatically capture source code and associated artifacts for static analysis. The system includes a memory storing instructions and at least one processor coupled with the memory to execute the instructions. The instructions when executed cause the processor to determine a current state of a project. The current state of the project includes a set of files in a directory to be translated into tree-based graph representations through a capture process for static analysis and a current capture status for individual files of the set of files. The individual files includes buildable modules that generates build outputs through a build process with a build command. The instructions when executed further cause the at least one processor to determine, based on the current capture status, a sequence of actions for one or more of the individual files in the set of files with the current capture status indicating not captured. The sequence of actions include translating the buildable modules in the one or more of the individual files into the tree-based graph representations with a build-capture based on an inferred build command. The instructions when executed further cause the at least one processor to execute the sequence of actions to capture the one or more of the individual files.

This disclosure also describes a non-transitory computer readable medium having stored instructions to provide an automatic elastic CPU for physical verification. The instructions, when executed by at least one processor, cause the at least one processor to determine a current state of a project. The current state of the project includes a set of files in a directory to be translated into tree-based graph representations through a capture process for static analysis and a current capture status for individual files of the set of files. The individual files includes buildable modules that generates build outputs through a build process with a build command. The instructions when executed further cause the at least one processor to determine, based on the current capture status, a sequence of actions for one or more of the individual files in the set of files with the current capture status indicating not captured. The sequence of actions include translating the buildable modules in the one or more of the individual files into the tree-based graph representations with a buildless-capture based on module definition files associated with the buildable modules. The instructions when executed further cause the at least one processor to execute the sequence of actions to capture the one or more of the individual files.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
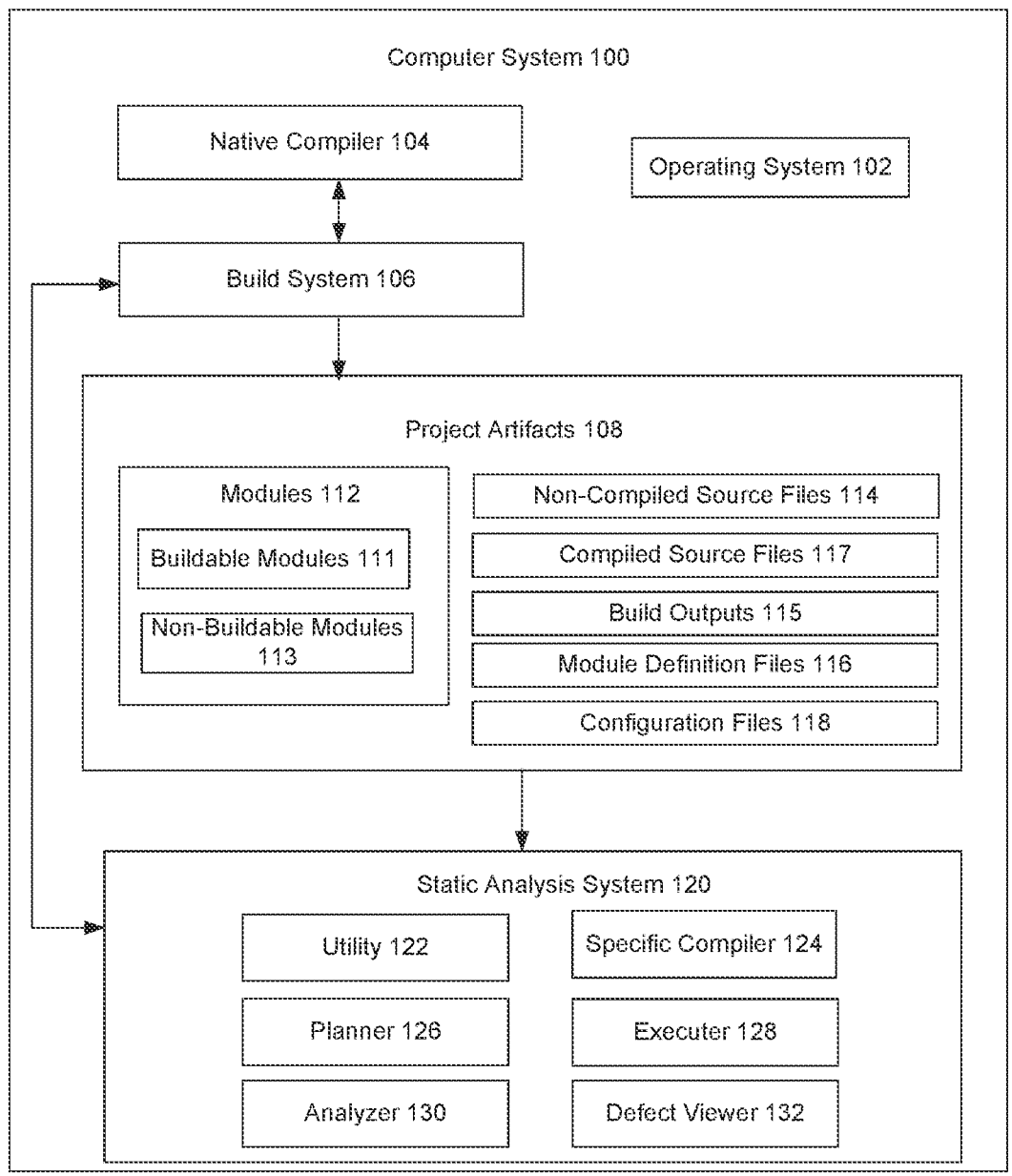
FIG. 1 illustrates a diagram of a computer system including a static analysis system, in accordance with some embodiments of the present disclosure.

Static analysis systems can analyze build outputs or source code of a project to generate an AST and find defects in the source code. A project can be a collection of files providing certain functionality to address a specific set of concerns for a user. Static analysis systems that analyze the build outputs can require the user to obtain the build outputs by compiling the project. Some source code may not be compiled to generate build outputs for the static analysis. Static analysis systems that analyze the source code may not require building the project, which can be easier for the user to perform static analysis. However, the ASTs generated by not building the source code may not accurately represent the source code. For example, module dependencies in the source code of the project may not be accurately obtained if the project is not built.

Aspects of the present disclosure relate to automatically capturing source code and associated artifacts of a project for static analysis. In some embodiments, the project can include a set of files in a directory to achieve one or more functions. The set of files can include source files and configuration files associated with buildable modules that generates build outputs through a build process with a build command. The set of files can also include source files and configuration files associated with non-buildable modules. A non-buildable module does not have an associated build command or build process. A static analysis system can determine a current state of the project. The current state of the project can include individual files in the set of files to be translated into tree-based graph representations through a capture process for static analysis. The current state of the project can also include current capture status for the individual files. Based on the current capture status, the static analysis system can determine a sequence of actions for one or more of the individual files with the current capture status indicating not captured. The sequence of actions can include translating compiled source files associated with the buildable modules into the tree-based graph representations with a build-capture based on the build command and translating non-compiled source files associated with the buildable modules into the tree-based graph representations with a buildless-capture. The sequence of actions can also include translating non-compiled source files associated with non-buildable modules into the tree-based graph representations with a buildless-capture. For the buildable modules, the build command can be inferred based on module types of the buildable modules. The build command can also be provide by a user. In response to the compiled source files not being captured by the build-capture, the static analysis system can translate the compiled source files with a buildless-capture based on module definition files associated with the buildable modules. The static analysis system can execute the sequence of actions to capture the individual files.

Advantages of the present disclosure include, but not limited to, improved accessibility of the static analysis system, improved scalability of the static analysis system, improved fidelity of the tree-based graph representations, and elimination of the requirement of a build environment for a user to perform static analysis on a project. In some embodiments, the user may have access to a build system and compilers. The user can provide a build command to the static analysis system to build the project and generate the tree-based graph representations for the files in the project. In some embodiments, the user may not need to provide the build command. The static analysis system can infer a default command based on module types of the modules in the project and can use the default command to build the project and generate the tree-based graph representations. In some embodiments, the user may not have access to a build system or compilers, the static analysis system can translate the files to the tree-based graph representations with a buildless-capture based on module definition files in the project. Therefore, both developers and non-technical users can use the static analysis system for project static analysis. In addition, the on-boarding process of the project can take much less time and the static analysis system can perform analysis on more projects. Furthermore, the static analysis system can improve the fidelity of the tree-based graph representations for the project. The users can choose the projects to invest time in to improve fidelity.

In some embodiments, a compilation-based static analysis system can generate an AST with a compilation-based approach. FIG. 1 illustrates a diagram of a computer system 100 including an example compilation-based static analysis system 120, in accordance with some embodiments of the present disclosure. Computer system 100 can include an operating system 102, a native compiler 104, a build system 106, project artifacts 108, and a static analysis system 120. In some embodiments, project artifacts 108 can be a project. In some embodiments, operating system 102, native compiler 104, build system 106, project artifacts 108, and static analysis system 120 can be implemented by one or more processors running instructions, such as processing device 1602 described in details below. In some embodiments, static analysis system 120 can be provided by a cloud-based service. Computer system 100 can further include data storage devices, memories, displays, input devices, processing units, and network interface devices. In some embodiments, computer system 100 can be computer system 1600 discussed in details below.

Native compiler 104 can be a program compiling a set of source files to produce a set of output files. The output files can be binary files executed by a user or libraries containing useful functionality and incorporated into other programs. In some embodiments, native compiler 104 can be implemented by a processor executing instructions to compile computer source code into executable code by the same or different processor. Example native compilers can include a C++ compiler for the C++ language and a Jikes™ compiler for the JavaScript language.

Build system 106 can be a program or a set of programs that invoke native compilers 104 to compile project source code and consume one or more module definition files. Build system 106 can produce a set of output artifacts (e.g., binary files) for deployment or distribution to users. Build system 106 can also provide a facility for running tests and maintaining dependencies. Examples of build system 106 can include Maven®, Ant®, Gradle®, and Make®. Maven® can be a build system primarily used for Java projects. Ant® can be a build system primarily used for Java projects. Gradle® can also be a build system primarily used for Java projects. Make® can be a build system primarily used for C/C++ projects. In some embodiments, build system 106 can be implemented by a processor running build instructions to build compiled source files 117 into build outputs 115 through invoking native compiler 104. Build outputs 115 can be a library file, an executable file, or a web application file. Build outputs 115 generated by build system 106 can include JARs, DLL, or executable binary files with filename extensions such as .exe and .elf. In some embodiments, computer system 100 may not include build system 106 and native compiler 104. Without build system 106 and native compiler 104, project artifacts 108 may not include build outputs 115.

In some embodiments, a compilation-based static analysis system 120 can generate an AST with a compilation-based approach. Static analysis system 120 may receive a build command (e.g., provided by a user) for build system 106 to build compiled source files 117. The build command can be passed to build system 106 by a utility 122 of static analysis system 120. Build system 106 can execute the build command and utility 122 can monitor the build process of compiled source files 117 by build system 106 and record invocations of native compiler 104. Utility 122 can replay the compiler invocations of native compiler 104 using specific compiler 124 of static analysis system 120 to generate ASTs for static analysis. Specific compiler 124 can be invoked with the same arguments that the user's native compiler 104 was invoked with. The arguments can include source code files, output file directories, library files, optimization flags, and attributes of data types. The compilation-based approach can also be referred to as build-capture.

Compilation-based static analysis system 120 can monitor all the compiler invocations used by build system 106 and thus identify the source files needed during the compiler invocations. As a result, ASTs generated by the compilation-based approach can accurately represent compiled source files 117 of the project. In addition, the compilation-based approach can obtain dependencies needed by the project to generate build outputs 115. A dependency can refer to a library used by the project to implement the functionality that the project provides. The dependency can also refer to a library automatically generated in the process of building the project. The dependencies for the project can be important for static analysis system 120 to understand control-flow and data-flow paths for the entire project.

However, the compilation-based approach requiring a build command can have challenges. First, compilation-based static analysis system 120 may require a user to provide the build command to start analyzing compiled source files 117 of a project. Some users may not know the build command to build the project. Additionally, even if some users know the appropriate build command, they may not have access to a build environment or build system 106.

Furthermore, requiring a build command for capturing compiled source files 117 of a project can increase the amount of time to complete the project. The users may need additional time to set up a build environment and provide the build command for each project to be analyzed. The build command requirement from a user makes the on-boarding process of the project for static analysis more manual. The on-boarding process of the project can include generating configuration files, locating project directories, setting up build environment, and installing the static analysis system. With an increasing number of projects for static analysis, the users may choose between analyzing a smaller number of their projects or spending extra time and money to analyze all their projects. Analyzing a smaller portion of the projects can increase the risk of missing critical security defects in a project.

The embodiments described in this disclosure relate to systems and methods for automatically capturing source code and associated artifacts of a project with a build-capture based on a default build command and a buildless-capture based on module definition files. In some embodiments, the default build command can be inferred based on module types of the module files in the project. Module types of the module files can include Maven®, Ant®, MSBuild®, and Make®. In some embodiments, the default build command can be inferred based on the build environment of the project, the operating system of the project, the files in the project, and the content of module definition files for the project. A user may not need to supply a build command or install a build system for static analysis, which can reduce time and money to capture the source code for static analysis. In addition, the present system facilitates automation of the on-boarding process of projects, which will help to significantly increase the number of projects for static analysis in a similar period of time as a typical system. In some embodiments, the present system receives a user-defined build command for static analysis of the project instead of using the default build command.

In some embodiments, compilation-based static analysis system 120 can capture project artifacts 108 of the project for static analysis. Compilation-based static analysis system 120 can include a utility 122, a specific compiler 124, a planner 126, an executor 128, analyzer 130, and defect viewer 132. Project artifacts 108 can include modules 112, non-compiled source files 114, build outputs 115, compiled source files 117, module definition files 116, and configuration files 118 in a directory of the project. In some embodiments, project artifacts 108 can be stored in a disk of computer system 100. In some embodiments, project artifacts 108 can be stored in a cloud-based storage system. Modules 112 can be discrete parts of the project and can be implemented by one or more processors to provide certain functions and address a specific set of concerns for a user. In some embodiments, the project can include a single module. In some embodiments, modules 112 can be module files in project artifacts 108. In some embodiments, modules 112 can be defined by module definition files 116. A dependency graph of modules 112 and associated files for each module can be determined according to project directory structures and module definition files 116. In some embodiments, the dependency graph can have a topological order to process the modules. In the topological order, if module A depends on module B, module B is processed before module A.

In some embodiments, modules 112 can include buildable modules 111 and non-buildable modules 113. Buildable modules 111 can be captured by build-capture through invoking an inferred default build command or a user supplied build command with build system 106. During build-capture, build system 106 can use the inferred default build command or the user supplied build command to invoke native compiler 104 on compiled source files 117 to generate build outputs 115 for buildable modules 111. Static analysis system 120 can monitor the build process of buildable modules 111 and invoke specific compiler 124 to generate ASTs representing the compiled source files 117 associated with buildable modules 111 for static analysis.

In some embodiments, computer system 100 may not include build system 106 or native compiler 104. Buildable modules 111 may not be compiled nor captured by build-capture. Static analysis system 120 can capture buildable modules 111 with buildless-capture. During buildless-capture, static analysis system 120 can capture buildable modules 111 with specific compiler 124 based on a dependency graph and associated files of buildable modules 111. The dependency graph of buildable modules 111 can be determined according to project directory structures of buildable modules 111 and can be refined by module definition files 116. With buildless-capture, static analysis system 120 can generated ASTs for buildable modules 111 that are not captured by build-capture. Compared with a buildable module, a non-buildable module may not have an associated build command. An example of a non-buildable module can be "package.json" used by node package manager (NPM). Non-buildable modules 113 may not be compiled to produce build outputs 115. In some embodiments, non-buildable modules can be captured by static analysis system 120 with specific compiler 124.

Module definition files 116 can provide information of modules 112 for build system 106 or a package manager to build or deploy a module. The package manager can be a program or a set of program retrieving module dependencies of the project based on module definition files 116. A module definition file can provide information needed to build a module. An example of a module definition file can be "pom.xml" used by Maven. Module definition files 116 can include configuration parameters of the project, such as libraries for the project and accessibility of the libraries during runtime. In some embodiments, the package manager can be included in build system 106. Example package manager can include NuGet and NPM. Nuget can be a .NET ecosystem package manager. NPM can manage dependencies in JavaScript projects. The information in module definition files 116 can include associated source files, compilers and compiler arguments to build the source files, module dependencies to build the project, the process to run a test suite, and the process to generate synthetic code. Example module definition files 116 can include "makefile" and "package.json."

In some embodiments, static analysis system 120 can generate actions with planner 126 to capture project artifacts 108. The actions can include capturing buildable modules 111 with build-capture or buildless-capture and capturing non-buildable modules 113. Executor 128 can execute the actions to capture buildable modules 111 and non-buildable modules 113 and generate ASTs for project artifacts 108, which are described in detail below. With the embodiments described herein, project artifacts 108 of the project can be captured to generate ASTs with build-capture and buildless-capture. Analyzer 130 can be implemented by one or more processors to analyze the generated AST to identify defects in the source code of the project and defect viewer 132 can be used to view the defects in the source code. The embodiments described in this disclosure can improve the fidelity of ASTs and reduce time and cost for project static analysis. The fidelity of an AST can refer to the quality of the source code compilation and the accuracy of the AST representing the source code.

In some embodiments, a convergence method can be used to automatically capture source code and associated artifacts of a project by a compilation-based approach with an inferred default build command or a user supplied build command. The convergence method can run in a loop until a desired state of the project is achieved, all files of the project are captured, or no further actions can be performed to move closer to the desired state. Each iteration of the convergence method can include three phases: observe, plan, and execute.

Figure 2:
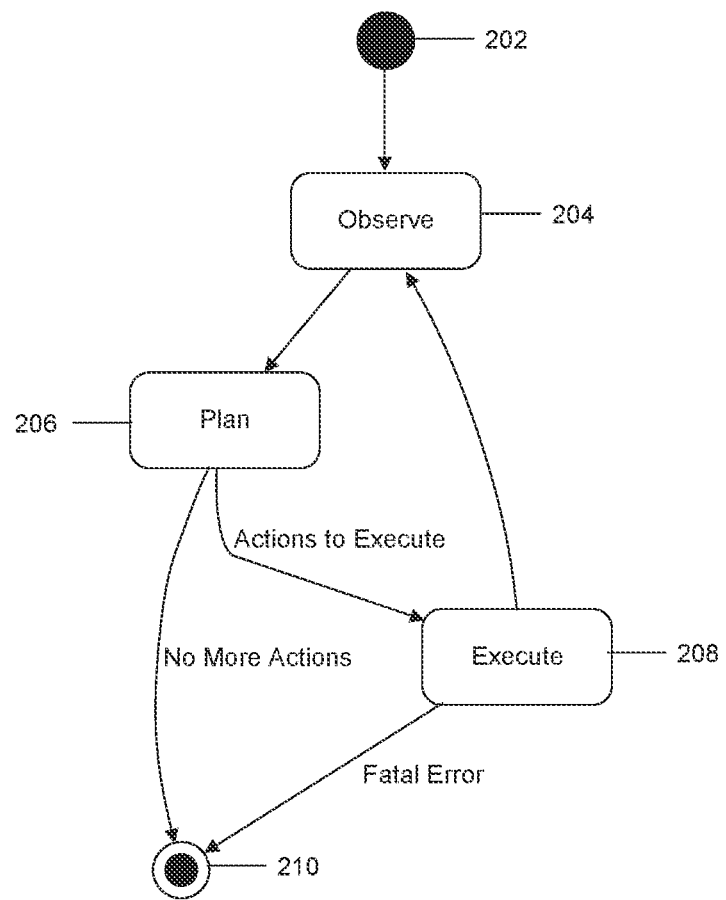
FIG. 2 illustrates a diagram representing a cycle of automatically capturing source code of a project, in accordance with some embodiments of the present disclosure.

FIG. 2 illustrates a diagram representing a cycle of automatically capturing source code of a project, in accordance with some embodiments of the present disclosure. In some embodiments, the project can be in a project directory and include modules, source files, module definition files, configuration files, and other files. In some embodiments, an example compilation-based static analysis system, for example, static analysis system 120, can repeat the cycle to automatically capture the source code of the project. In some embodiments, as shown in FIG. 2, the cycle of automatically capturing source code can start at operation 202, include observe phase 204, plan phase 206, and execute phase 208, and end at operation 210.

In some embodiments, during observe phase 204, a current state of the project can be recorded. The current state of the project can include a set of files in the project directory to be captured for static analysis and current capture status of the files in the project. Observe phase 204 can provide the current state of the project as inputs to plan phase 206. In some embodiments, during plan phase 206, a planning component, such as planner 126, can receive the current state of the project and generate a plan including a set of actions to capture the files in the project and reach a desired state of the project. The set of actions can include capturing methods for the files in the project. In some embodiments, the desired state can be capturing the files in the project at a fidelity level higher than a threshold value (e.g., about 90%). The fidelity level can be subject to external constraints, such as available build system 106 and access to project dependencies. If plan phase 206 determines there are no more actions to execute, the cycle can terminate at operation 210. If plan phase 206 outputs more actions to execute, execute phase 208 can execute actions and provide the current state of the project after the actions as outputs back to observe phase 204. If a fatal error, such as a program crash, occurs during execute phase 208, the cycle can also terminate at operation 210.

In some embodiments, observe phase 204 can determine a current state of the project. In some embodiments, observe phase 204 can build a model of the structure of the project, such as a dependency graph, and provide a current capture status for each file of the project. In some embodiments, observe phase 204 can obtain the following information about the project shown in Table 1 below:

TABLE 1

Information about the Project Obtained in the Observe Phase

| Information | Purpose of the information |
|---|---|
| Build Systems in Use | Used by planner 126 (e.g., a planning component) to infer a build command to use for build-capture. |
| List of Source Files with Classification | Each file found in the project directory is classified according to the file's family and type. The file family and file type are used to determine how to treat the file. For instance, source files can be passed to an appropriate compiler while configuration files can be recorded in case they are needed later by the static analysis. The classification of a file can be done by identifying the file extension. For example, a file named "foo.c" can be classified as a source file (file family) containing C source code (file type). |
| Module Relationships | Modules in a project can aggregate other modules or have dependencies on other modules. Understanding the module dependency graph is important for emitting the module in a topological order. Symbols of the modules defined in dependencies are available for subsequent compiler invocations. |
| File to Module Associations | This information can be used to group files together so that they are emitted together. Emitting source files of the same type and belonging to the same module together is important. This is how the native compiler accessed by the user would emit the source files. Emitting source files belonging to the same module together can ensure that symbols defined in a given source file are available for consumption on other source files. Additionally, emitting source files in module specific groups can avoid issues with symbol name collisions. |
| List of Files Captured | The planner can use this information to determine which files have been captured and which files have not been captured. The files that have been captured are stored in a database on the file system. Files may have been captured on a previous run, so prior to the first observe-plan-execute cycle some files may be recorded as having been captured. |

In some embodiments, a project can include files assigned to different file families, such as project files or module definition files, source files, binary files, configuration files, text files, and unknown files. For the purpose of the present disclosure, Table 2 below can include example file families assigned to each file in a project directory, but not meant to be limiting:

TABLE 2

File Families Assigned to Each File in a Project Directory

| File Family | Description | Example File | Example File Type |
|---|---|---|---|
| Project | The file is a project file that indicates the presence of a module. | pom.xml | Maven ® project file |
| Source | The file contains source code that can be captured by routing it to an appropriate compiler. | foo.c | C source file |
| Binary | The file is a binary file, possibly a build output that can be decompiled by an appropriate decompiler. | bar.jar | Java JAR file |

TABLE 2-continued

File Families Assigned to Each File in a Project Directory

| File Family | Description | Example File | Example File Type |
|---|---|---|---|
| Configuration | The file is a configuration file that can be capture by recording its contents in case it is needed by the analysis. | baz.properties | Java properties files |
| Text | The file is human readable text file and can be ignored. This file family can be used to provide feedback to the user. | README.md | Markdown text file |
| Unknown | Catch all file family for any files that have no known classification. These files can be ignored. | bazar.custom | Unknown file with the extension of ".custom" |

In addition to the file families, files can also be classified according to their types. The number of file types can be large so the file types are not listed in their entirety. For the purpose of the present disclosure, file types listed in Table 3 below may apply to the examples and embodiments discussed herein, but not meant to be limiting.

TABLE 3

Example File Types of the Files in a Project Directory

| File Type | Description |
|---|---|
| Project Files | |
| pom.xml | Maven project file |
| *.gradle | Gradle project file |
| package.json | JavaScript project file |
| *.sln | MSBuild solution file |
| *.csproj | C# project file |
| Source Files | |
| *.java | Java source file |
| *.js | JavaScript source file |
| *.cs | C# source file |
| Binary Files | |
| *.dll | Windows dynamic link library file |
| *.jar | Java JAR file |
| *.war | Java web application archive |
| Configuration Files | |
| *.properties | Java properties file |
| *.yml | YAML configuration file |
| Text Files | |
| *.txt | Text file |
| *.md | Markdown file |

In some embodiments, some files can have extensions mapping to a same file type. For example, C++ source files can have the extensions "*.cc," "*.cpp," "*.cxx," "*.c++," or "*.C." These extensions can map to a same file type of C++ source files.

Referring to FIG. 2, in observe phase 204, a model of the project can be built in observe phase 204 according to some embodiments. The model of the project can be a dependency graph illustrating relationships of modules 112 in the project. In some embodiments, an approximate model can be built in observe phase 204 and a refinement step can be optionally performed in plan phase 106 to improve the accuracy of the model.

In some embodiments, the modules in a project directory can be organized in a hierarchy following the directory structure. An approximate model of the project can be built using a heuristic process based on the hierarchy of the directory structure. The heuristic process can determine the hierarchy levels of modules 112 in the project directory and build the approximate model. The approximate model can illustrate a dependency graph of the project. As shown in the following example project, sub-module B is defined at a lower level in the directory structure than module B. Accordingly, module B can be a parent of sub-module B in the approximate model of the project.

/path/to/my-project/pom.xml . . . module files . . .
/path/to/my-project/module-A/pom.xml . . . module files . . .
/path/to/my-project/module-B/pom.xml . . . module files . . .
/path/to/my-project/module-B/sub-module-B/pom.xml . . . module files . . .

Figure 3:
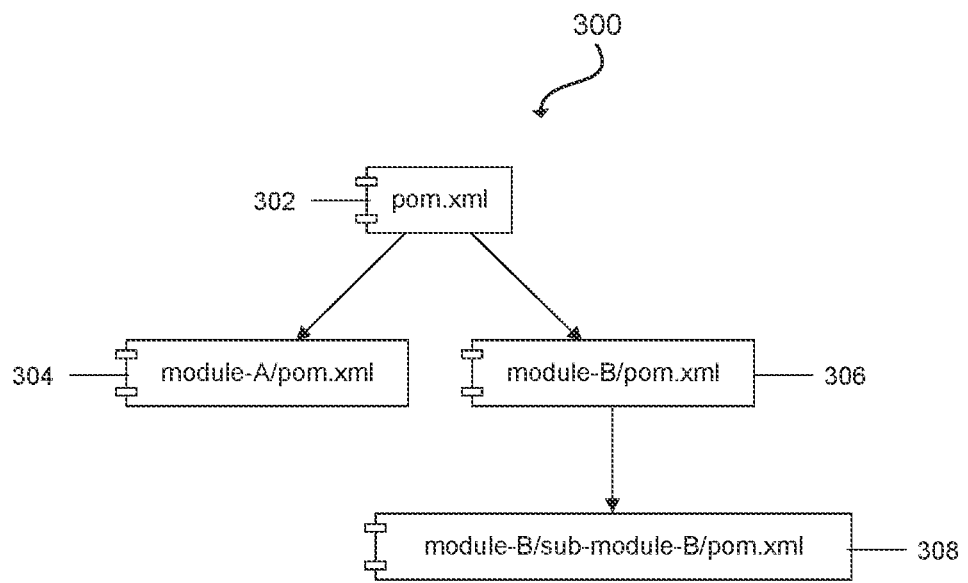
FIG. 3 illustrates a module dependency graph generated while automatically capturing source code, in accordance with some embodiments of the present disclosure.

The above example code can illustrate a project in a directory called "my-project" and the project directories for modules "pom.xml," "module-A/pom.xml," module-B/pom.xml," and "module-B/sub-module-B/pom.xml." In some embodiments, the above example project can have a module dependency graph 300 as shown in FIG. 3. In module dependency graph 300 of FIG. 3, module 302 "pom.xml" can be a parent of module 304 "module-A/pom.xml" and module 306 "module-B/pom.xml." Module 306 "module-B/pom.xml" can be a parent of module 308 "module-B/sub-module-B/pom.xml."

In some embodiments, module 308 is at a lower level than module 306, but module 306 may not depend on module 308. The directory structure may not produce an accurate model of the dependency graph. The model of the dependency graph can be further refined in plan phase 206, which is discussed in more details below.

In some embodiments, a project can include modules with different types. In some embodiments, a module type can correspond to a build system that typically operates with the module. For example, a Java project can include a web-service module implemented in Java and a web-application front-end implemented in JavaScript. The web-service module may use Maven® or Gradle® while the JavaScript web-application module may use NPM®. For a project with mixed module types, multiple module dependency graphs can be produced. Each module type can have a corresponding dependency graph, as shown in the following example project:

/path/to/my-project/pom.xml . . . module files . . .
/path/to/my-project/module-A/pom.xml . . . module files . . .
/path/to/my-project/module-B/pom.xml . . . module files . . .
/path/to/my-project/module-B/sub-module-B/pom.xml . . . module files . . .
/path/to/my-project/webapp/package.json . . . module files . . .

Figure 4:
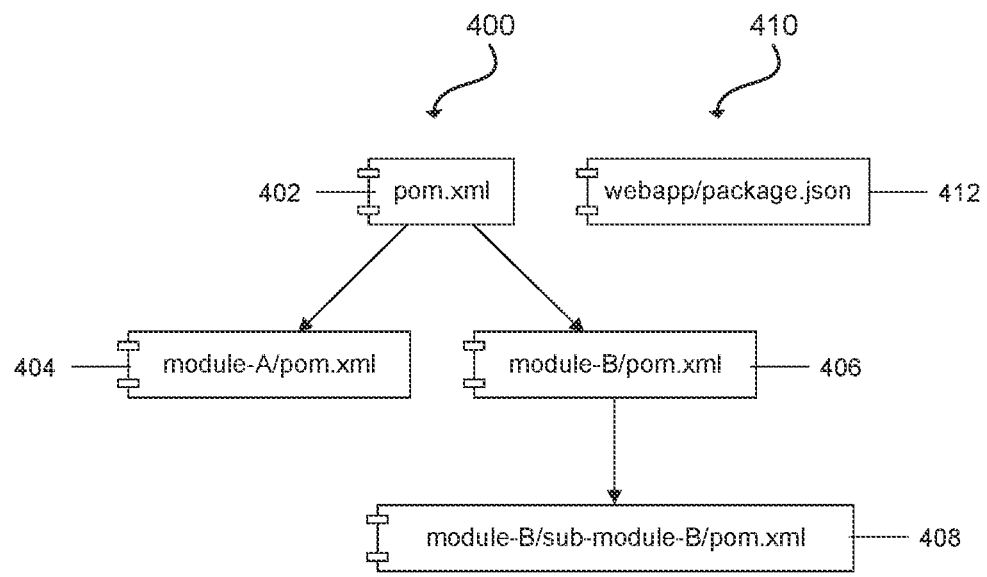
FIG. 4 illustrates another module dependency graph generated while automatically capturing source code, in accordance with some embodiments of the present disclosure.

The above example code can illustrate a project in a directory called "my-project" and the project directories for modules "pom.xml," "module-A/pom.xml," module-B/pom.xml," "module-B/sub-module-B/pom.xml," and "webapp/package.json." In some embodiments, the above example project can have a module dependency graph 400 and a module dependency graph 410 as shown in FIG. 4.

Module dependency graph 400 in FIG. 4 can include Maven® modules 402-408 with four nodes. Module 402 can be a parent of module 404 and module 406. Module 406 can be a parent of module 408. Module dependency graph 410 in FIG. 4 can include webapp module 412 with a single node. In some embodiments, webapp module 412 can be build output of a web application.

Referring to FIG. 2, in observe phase 204, source files in the project can be associated with corresponding modules according to some embodiments. In some embodiments, the source files can be associated with the modules using a heuristic process based on the directory structure of the project, similar to the heuristic process of building the dependency graph model. In some embodiments, the heuristic process to associate source files with modules can include two operations. In the first operation of the heuristic process, a source file can be associated with a module based on the directory structure when the source file is in a same directory as the module definition file of the module. In some embodiments, a source file can be associated with a module based on the directory structure when the source file is in a child directory of the module definition file of the module and there is no additional module definition files in the directories between the source file and the module definition file. For example:

Example 1—Source File in a Same Directory as Module

/path/to/my-project/makefile
/path/to/my-project/B.c

Example 2—Source File in a Module Sub-Directory (Src)

/path/to/my-project/makefile
/path/to/my-project/src/B.c

Example 3—Source File in a Module Child Directory (Sub-Src)

/path/to/my-project/makefile
/path/to/my-project/src/sub-src/B.c

Example 4—Two Modules in the Directory—

"B.c" is associated with the makefile in the "sub-module" directory since this is the closest module in the directory.
/path/to/my-project/makefile
/path/to/my-project/sub-module/makefile
/path/to/my-project/sub-module/src/B.c As illustrated in example 1, source file "B.c" is located in a same directory as module definition file "makefile" for a module. In examples 2 and 3, source file "B.c" is located in a respective sub-directory (src) and child directory (sub-src) of module definition file "makefile." Source file "B.c" can be associated with the module having module definition file "makefile." In example 4, source file "B.c" can be associated with the ode module in the "sub-module" directory having module definition file "makefile."

In the second operation of the heuristic process, each file in the directory of the project can be assigned an affinity. The affinity can indicate a priority that a particular file typically associates to a module definition file. In some embodiments, the affinity can handle multiple module definition files in a project directory with different module types. As shown in the following example, a project directory can include a module definition file "makefile" and a module definition file "package.json." The project can include a C source file "bar.c" and a JavaScript source file "foo.js" in a child directory (src). As "bar.c" is typically associated with "makefile," "bar.c" can have a higher affinity and priority to associate with "makefile" than "package.json." Similarly, as "foojs" is typically associated with "package.json," "foo.j s" can have a higher affinity and priority to associate with "package.json" than "makefile." With affinity for each file, the C source file "bar.c" can be correctly associated with the module definition file "makefile," and the JavaScript source file "foo.j s" can be correctly associated with the module definition file "package.json."

"bar.c" is associated with the "makefile" while "foo.js" is associated with the "package.json" file
/path/to/my-project/makefile
/path/to/my-project/package.json
/path/to/my-project/src/bar.c
/path/to/my-project/src/foo.js In some embodiments, some projects may not have a module definition file for a module. In some embodiments, static analysis system 120 may not recognize the module definition file for a module. A placeholder module can be created in the root of the project directory with an affinity for all file types. A placeholder module definition file can define the placeholder module and can be associated with the project. For example, as shown in the following example, source files "foo.c," "bar.c," and "bazar.c" can be associated with the placeholder module.

Figure 5:
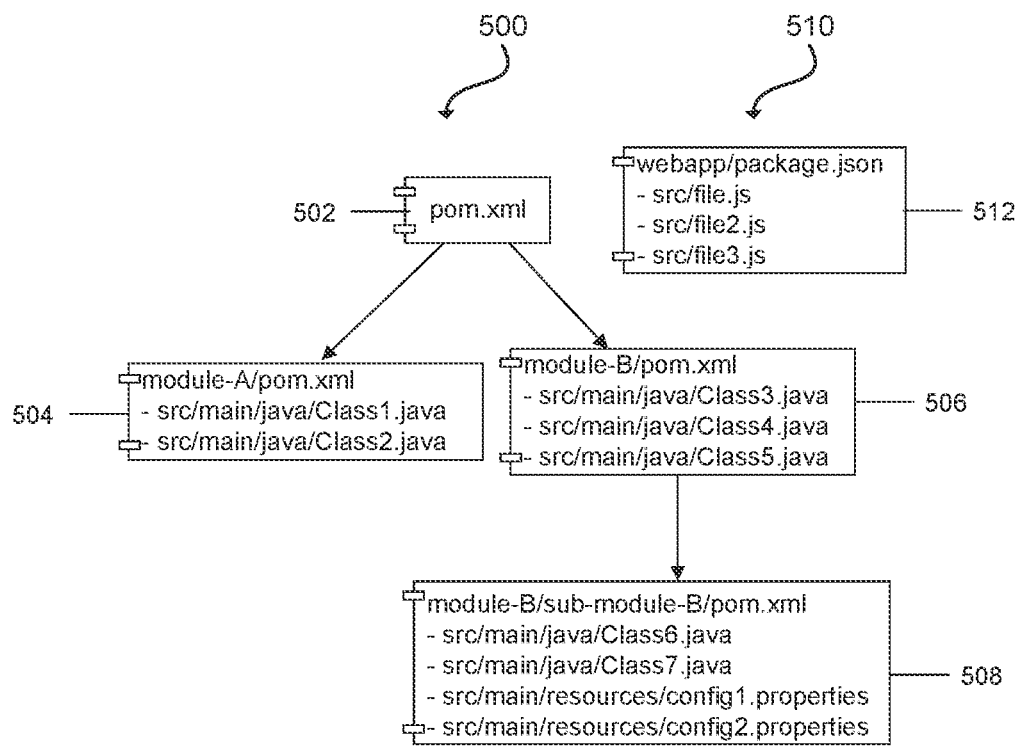
FIG. 5 illustrates a module dependency graph and file associations for modules in a directory, in accordance with some embodiments of the present disclosure.

In this example, all of the source files are associated with the placeholder module definition file.
/path/to/my-project/foo.c
/path/to/my-project/src/bar.c
/path/to/my-project/src/lib/bazar.c In some embodiments, an example project can include files in a following example directory structure:
/path/to/my-project/pom.xml
/path/to/my-project/module-A/pom.xml
/path/to/my-project/module-A/src/main/java/Class1.java
/path/to/my-project/module-A/src/main/java/Class2.java
/path/to/my-project/module-B/pom.xml
/path/to/my-project/module-B/src/main/java/Class3.java
/path/to/my-project/module-B/src/main/java/Class4.java
/path/to/my-project/module-B/src/main/java/Class5.java
/path/to/my-project/module-B/sub-module-B/pom.xml
/path/to/my-project/module-B/sub-module-B/src/main/java/Class6.java
/path/to/my-project/module-B/sub-module-B/src/main/java/Class7.java
/path/to/my-project/module-B/sub-module-B/src/main/resources/config1.properties
/path/to/my-project/module-B/sub-module-B/src/main/resources/config2.properties
/path/to/my-project/webapp/package.json
/path/to/my-project/webapp/src/file1.js
/path/to/my-project/webapp/src/file2.js
/path/to/my-project/webapp/src/file3.js In some embodiments, as shown in FIG. 5, an example compilation-based static analysis system 120 can build dependency graphs 500 and 510 and associate files for modules of the above example project based on the directory structure obtained in observe phase 204. As shown in FIG. 5, the example project can include module dependency graph 500 and module dependency graph 510. Module dependency graph 500 can include modules 502-508 with four nodes. Module 502 can be a parent of module 504 and module 506. Module 506 can be a parent of module 508.

Each of modules 502-508 can have corresponding associated files. Module dependency graph 510 in FIG. 5 can include a single webapp module 412 and associated files.

In some embodiments, static analysis system 120 can determine capture statuses of the files in the project. In some embodiments, the module dependency graphs and capture status of the files determined in observe phase 204 can be used as input to plan phase 206 to generate actions for the files of the example project.

Figure 6:
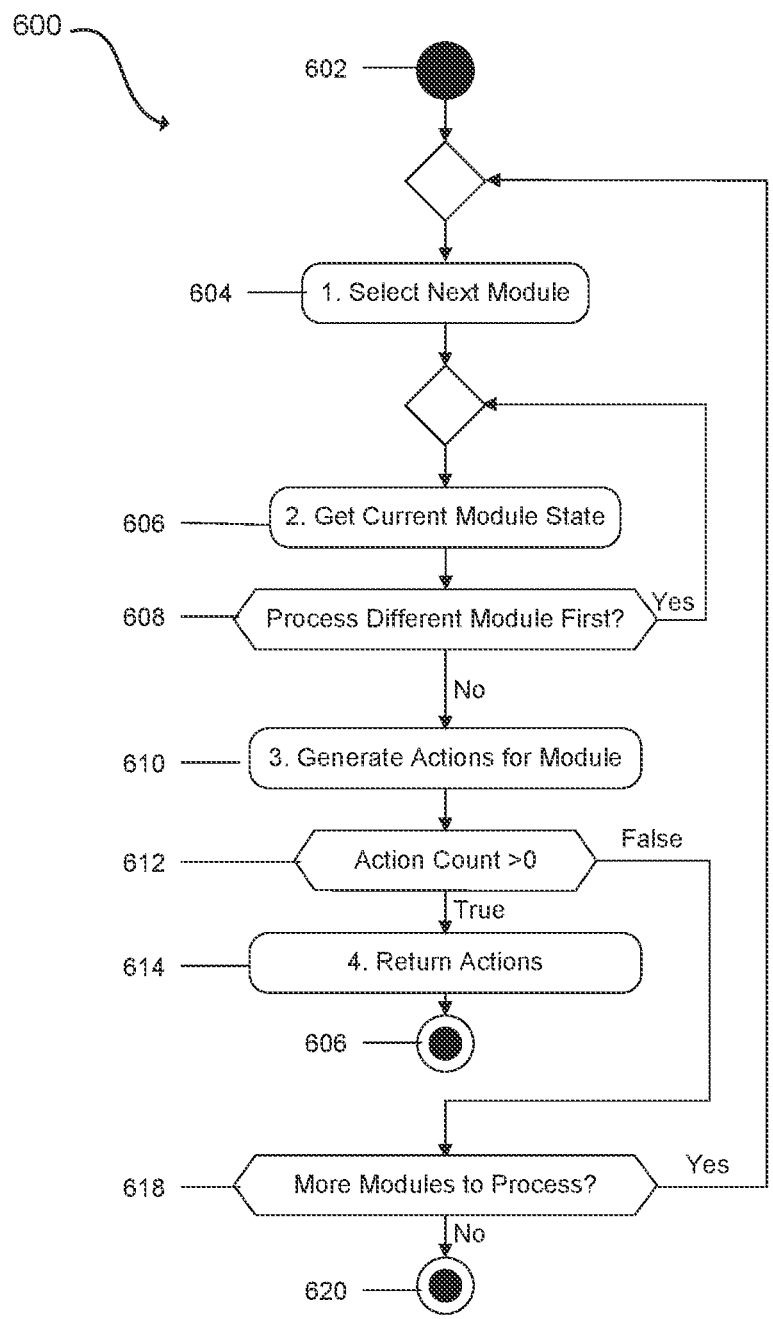
FIG. 6 illustrates a flow chart for a planner to generate a set of actions to be executed, in accordance with some embodiments of the present disclosure.

Referring to FIG. 2, in plan phase 206, static analysis system 120 can take the output of observation phase 204 as input and generate a set of actions to capture the files. In some embodiments, the inputs to plan phase 206 can include modules of the project, dependency graphs with module relationships and file associations, and capture statuses of the files in the project. FIG. 6 illustrates a flow chart 600 for a planner 126 of static analysis system 120 to generate a set of actions for the files based on the inputs to plan phase 206, in accordance with some embodiments of the present disclosure. In some embodiments, planner 126 can be a planning component of the example compilation-based static analysis system 120 to generate actions to capture project artifacts 108 of the project.

Referring to FIG. 6, in some embodiments, after a process flow starts in operation 602, planner 126 can select a next module to generate actions in operation 604. In operation 606, planner 126 can get the module state for the selected module. In operation 608, if planner 126 decides to process a different module first, planner 126 can be routed to operation 606 to get the module state for the different module. If planner 126 decides to process the selected module, planner 126 can generate a number of actions for the selected module in operation 610. Referring to FIG. 2, the number of actions can include capturing buildable modules 111 with build-capture or buildless-capture and capturing non-buildable modules 113 by invoking specific compiler 124. In operation 612, if the number of generated actions is greater than zero, planner 126 can return the number of actions in operation 614 and terminate the process flow in operation 616. If the number of generated actions is not greater than zero, planner 126 can check if there are more modules to process in operation 618. If there are more modules to process, planner 126 can go back to operation 604 and select a next module to process. If there are no modules to process, planner can go to operation 620 to terminate the process flow.

As shown in FIG. 6, in operation 604, planner 126 can select the next module, which can be a buildable module or a non-buildable module. In some embodiments, static analysis system 120 can process buildable modules based on dependencies in a dependency graph of the buildable modules. Building a higher-level buildable module in a project directory can require building a lower-level buildable modules first. For example, a Maven® project module layout can be shown below for the example project in dependency graph 300 of FIG. 3:

/path/to/my-project/pom.xml . . . source files . . .
/path/to/my-project/module-A/pom.xml . . . source files . . .
/path/to/my-project/module-B/pom.xml . . . source files . . .
/path/to/my-project/module-B/sub-module-B/pom.xml . . . source files . . .

In some embodiments, based on the above Maven® project module layout, module "pom.xml" is at a top level of the example project and "module-A/pom.xml," "module-B/pom.xml," and "module-B/sub-module-B/pom.xml" are at lower levels of the example project. If top-level "pom.xml" depends on other lower-level modules, as shown in dependency graph 300, building of the top-level module "pom.xml" can require building of all of the lower-level modules "module-A/pom.xml," "module-B/pom.xml," and "module-B/sub-module-B/pom.xml" in the sub-directories.

In some embodiments, static analysis system 120 can process non-buildable modules without a particular processing order. For example, JavaScript modules of a project can be shown in following project directories:

/path/to/my-project/package.json . . . source files . . .
/path/to/my-project/module-A/package.json . . . source files . . .
/path/to/my-project/module-B/package.json . . . source files . . .
/path/to/my-project/module-B/sub-module-B/package.json . . . source files . . .

In some embodiments, static analysis system 120 can process the JavaScript modules in a bottom-up order based on the hierarchy of the modules from a bottom level to a top level, for example, "module-B/sub-module-B/package.json"->"module-B/package.json" ->"module-A/package.json"->"package.json." In some embodiments, static analysis system 120 can process the JavaScript modules in a top-down order based on the hierarchy of the modules from a top level to a bottom level, for example, "package.json"->"module-A/package.json"->"module-B/package.json"->"module-B/sub-module-B/package.json." Both the bottom-up order and the top-down order can be valid processing orders to capture the JavaScript modules of the project.

In some embodiments, planner 126 can use build-capture to capture buildable modules 111 and static analysis system 120 can monitor the build process for compiler invocations. In some embodiments, planner 126 can use build-capture to capture the top-level buildable module, such as module 302 in FIG. 3, in a multi-module project. As the top-level buildable module (e.g., module 302) can depend on other modules (e.g., modules 304, 306, and 308) in the multi-module project, the other buildable modules can be built during the build-capture process of the buildable top-level module. As a result, build-capture can capture source files associated with all the buildable modules in a single process. In some embodiments, planner 126 can capture non-buildable modules 113 with any processing order. Therefore, planner 126 can process modules 112 including both buildable modules 111 and non-buildable modules 113 in a top-down order.

In some embodiments, build system 106 may also process modules 112 in the top-down order. Build system 106 can retrieve module definition files 116 for modules 112, determine a model of dependencies (e.g., dependency graph 300 in FIG. 3) for modules 112, and process modules 112 in the top-down order.

In some embodiments, planner 126 can check the capture status of a module with a completion check predicate before capturing the associated source files. The completion check predicate can be a Boolean function indicating the capture status for the module. If the completion check predicate indicates the capture status of the module as not captured, planner 126 can process the module. If the completion check predicate indicates the capture status of the module as already captured, planner 126 may not need to process the module for a second time.

In some embodiments, planner 126 can process modules 112 of a multi-module project having multiple groups of related modules in a top-down order. For example, as shown in FIG. 3, module 302 "pom.xml" and module 304 "module-A/pom.xml" can be related and built together, and module 306 "module-B/pom.xml" and module 308 "module-B/sub-module-B/pom.xml" can be related and built together. With the top-down order, planner 126 can first attempt build-capture on top-level module 302, which can lead to capturing of source files in both module 302 and module 304. Next, planner 126 can attempt to process module 306, which can lead to capturing of source files in both module 306 and module 308.

In some embodiments, planner 126 can change the processing order of modules 112 and modules 112 may not be processed in the top-down order. In some embodiments, planner 126 can change the processing order under following two conditions. Under the first condition, build-capture for a buildable module may not work and static analysis system 120 may use buildless-capture to capture compiled source files of the buildable module. Under the second condition, when emitting a first module, specific compiler 124 may need symbols defined in a source file of a second module. The first module may depend on the second module. Specific compiler 124 can emit the source file of the second module for the symbols definitions to use when emitting the first module. An example specific compiler 124 such as a C#compiler can operate under the second condition.

Figure 7:
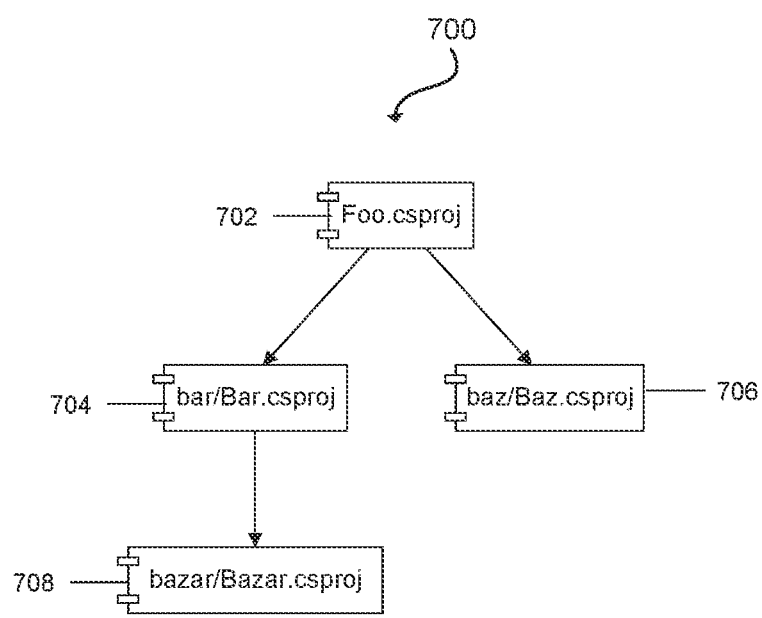
FIG. 7 illustrates a module dependency graph of a collection of example modules, in accordance with some embodiments of the present disclosure.

In some embodiments, planner 126 can process modules 112 with buildless-capture in a topological order. The topological order can be an order to process modules 112 based on a dependency graph of modules 113. FIG. 7 illustrates a module dependency graph 700 of a collection of C #example modules of a project for buildless-capture, in accordance with some embodiments of the present disclosure. The project can include module 702 "Foo.csproj," module 704 "bar/Bar.csproj," module 706 "baz/Baz.csproj," and module 704 "bazar/Bazar.csproj" with dependencies shown in dependency graph 700. In some embodiments, the inferred build command may be incorrect or computer system 100 may not include build system 106 or native compiler 104. Planner 126 may attempt build-capture on module 702 but module 702 may not be built. Planner 126 can retrieve module definition files 116 associated with module 702 to determine dependencies of module 702 and refine dependency graph 700 of the project. Planner 126 can determine that module 702 depends on module 704, which further depends on module 708. Planner 126 can determine that module 708 has no dependencies and can emit module 708 to produce an output file including symbol definitions for modules 702 and 704. Next, planner 126 can process module 704 followed by module 706 and then module 708.

In some embodiments, planner 126 can associate a state machine with each module in modules 112 to generate actions for capturing each module in modules 112. The state machine can depend on whether the module in modules 112 is a buildable module in buildable modules 111 or a non-buildable module in non-buildable modules 113. For a buildable module in buildable modules 111, build system 106 can retrieve the information in corresponding module definition file in the set of module definition files 116 associated with the buildable module in the set of buildable modules 111 and invoke appropriate native compiler 104 to produce build outputs 115. Example buildable modules 111 can include Maven® modules, and MSBuild® solutions and C #projects. In some embodiments, each buildable module type can have a default build command. Static analysis system 120 can infer the default build command for a buildable module in the buildable modules 111 based on the module type of the buildable module. Static analysis system 120 can use the default build command to invoke build system 106 on the buildable module in the buildable modules 111. Example default build commands can be illustrated in Table 4 below:

TABLE 4

Default Build Command for Example Buildable Module Types

| Module Type | Module File | Default Build Command |
| --- | --- | --- |
| Maven ® | pom.xml | mvn-DskipTests-DskipITs clean install |
| Ant ® | build.xml | ant |
| MSBuild ® | *.sln, e.g. MyProject.sln OR *.csproj, e.g. MyProject.csproj | dotnet msbuild /t:Restore;Clean;Build |
| Make ® | Makefile | make |

Figure 8A:
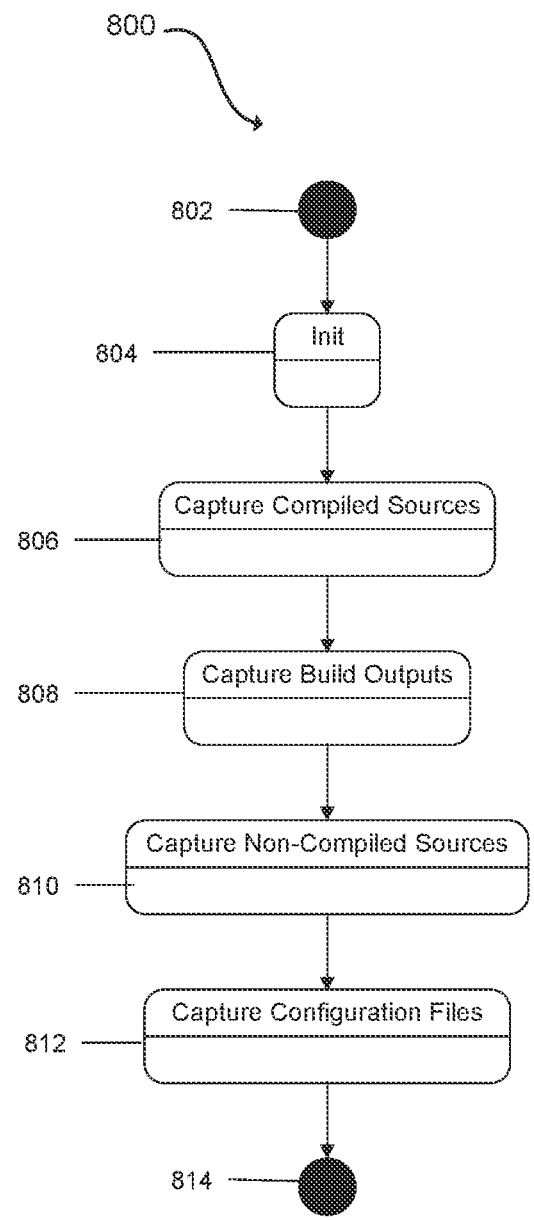
FIG. 8A illustrates capturing files with a state machine for a module, in accordance with some embodiments of the present disclosure.

FIG. 8A illustrates capturing files with a state machine 800 for buildable modules 111, in accordance with some embodiments of the present disclosure. In some embodiments, Table 5 below describes the files captured with state machine 800 for buildable modules 111.

TABLE 5

Files Captured during Capturing a Buildable Module

| Files | Description |
| --- | --- |
| Compiled Source Files | These are source files associated with modules that are built with a particular native compiler, e.g. Java sources, C# sources, etc. |
| Build Outputs | For some module types, the build outputs may also be captured. For example, for a maven module that produces a Java web-application, the web-application archive or ".war" file should also be captured, e.g. "my-app.war." |
| Non-Compiled Source Files | Some buildable modules may have non-compiled source files associated with the buildable modules, for example, a Java web-application associated with a JavaScript front-end. |
| Configuration Files | Some buildable modules may have configuration files that are used to configure the runtime behavior of the modules. The static analysis can use the configuration files to better understand the modules. |

Referring to FIG. 8A, after state machine 800 starts in operation 802, planner 126 can generate actions for internal setup in initialization state 804. The actions generated in initialization state 804 can include implementation details to implement state machine 800.

Figure 8B:
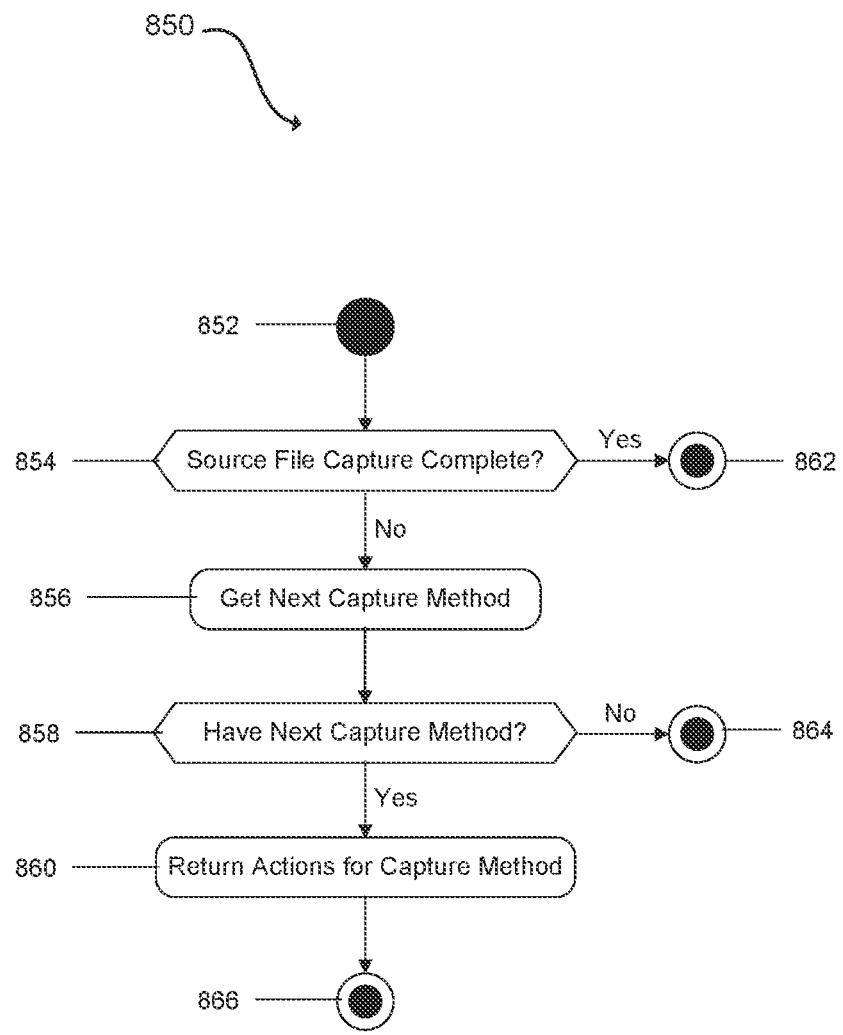
FIG. 8B illustrates a flowchart to capture source files, in accordance with some embodiments of the present disclosure.

Referring to FIG. 8A, in "capture compiled sources" state 806, planner 126 can generate actions to capture compiled source files 117 that have an associated compiler. In some embodiments, FIG. 8B illustrates a flowchart 850 to capture compiled source files 117 that have an associated compiler. Flowchart 850 can illustrate the detailed process in "capture compiled sources" state 806 of FIG. 8A. As shown in FIG. 8B, after flowchart 850 starts in operation 852, planner 126 can determine if source file capture is completed in operation 854 for buildable module 111 in operation 852. If source file capture is complete, flowchart 850 ends in operation 862. If source file capture is not completed, planner 126 can get next capture method in operation 856. Next, planner 126 can determine if there is an additional capture method for compiled source files 117 in operation 858. If there is no additional capture method, flowchart 850 ends in operation 864. If there is an addition capture method, planner 126 can return actions for the additional capture method in operation 860 and flowchart 850 ends in operation 866.

In some embodiments, planner 126 can use a Boolean predicate function to determine the source file capture status. The Boolean predicate function can receive compiled source files 117 associated with buildable modules 111 and source files 114 already captured as inputs. The Boolean predicate function can return true if relevant source files have been captured and false otherwise. In some embodiments, each module type can be associated with a specific Boolean predicate function, for example, Boolean predicate functions for Maven®, Gradle®, and MSBuild®. In some embodiments, if a user provides a build command to capture compiled source files, the Boolean predicate function can be set to constant true.

In some embodiments, each module type can have an associated set of capture methods, for example, build-capture and buildless-capture. Static analysis system 120 can use each of the associated capture methods in turn to capture each source file associated with the module. If the Boolean predicate function indicates that the capture of the module is not completed, planner 126 can look up the next capture method for the module. In some embodiments, planner 126 can use build-capture and buildless-capture for a buildable module.

In some embodiments, for build-capture, planner 126 can generate actions to invoke a default build command to capture modules 112. After static analysis system 120 has attempted build-capture for modules 112, a number of outcomes can be shown in Table 6 below:

TABLE 6

Outcomes after Build-Capture of a Module

| Outcome | Description |
| --- | --- |
| All Modules Successfully Captured | All of the source files for the modules in the project are successfully captured. The planner can move on to capturing the rest of the files needed to analyze the project, e.g. non-compiled source files and configuration files. |
| Complete Failure | The build command fails completely and does not change the capture status, i.e. no additional files are captured. One example cause of the failure is that the computer system does not have the required build system installed. Other causes can include:<br>The default build command is wrong, e.g. the module may require that the build system is invoked with specific arguments in order to build the module<br>The build system installed on the system may not be a correct version<br>The build system may be unable to download the dependencies needed to build the module |
| Individual Module Partially Captured | When invoking build-capture on an individual module, several compiler invocations may be needed to capture the module and one of them may fail. In this case, only a subset of the source files for the individual module are captured. |
| Subset of Modules Captured | Some of the modules in the project are captured successfully while other modules are not captured. This case may occur in the absence of any errors. Sometimes building a module at a higher-level in the project directory tree may not cause child modules at lower-levels to build. |
| Individual Modules Partially Captured and Subset of Modules Captured | This case can be a combination of the two cases above: individual module partially captured and subset of modules captured. The modules in this case can include three categories: successfully captured, partially captured, and complete failed. |

In some embodiments, planner 126 can have a strategy for each of the outcomes in Table 6. Planner 126 can generate capture actions for modules 112 in a top-down order to respond to the outcomes. In some embodiments, the response of planner 126 to the outcomes can be shown in Table 7 below:

TABLE 7

Response of a Planner to the Outcomes after Build Capture of a Module

| Outcome | Response of the Planner |
| --- | --- |
| All Modules Successfully Captured | For each module in the project, the predicate function for the module will return true to indicate that the source files for the module were successfully captured. Because of this, the planner will not generate any further actions to capture the compiled source files for the module. |
| Complete Failure | For each module in the project, the predicate function for the module will return false to indicate that the source files for the module were not successfully captured. Because of this, the planner will generate actions (e.g., buildless-capture) to attempt to capture the source files for the module. |
| Individual Module Partially Captured | The predicate function returns true or false depending on whether the source files for the module were captured. If the predicate function returns false, then the planner will generate actions that will use buildless-capture to capture the compiled source files for the module. |
| Subset of Modules Captured | In this case, the predicate function will return true for those modules that were captured and false for those modules that were not captured. The planner can generate actions for those modules that have not been captured and skip those modules that were already captured. For those modules that were not captured, the planner can start by generating actions to invoke build-capture before moving to other capture methods. |
| Individual Modules Partially Captured and Subset of Modules Captured | This is a combination of the cases listed above, the planner will generate further actions to capture partially captured modules that the predicate function returned false, as well as modules that were not captured at all. |

In some embodiments, for modules 112 not captured with build-capture, planner 126 can generate actions to capture modules 112 with buildless-capture. The actions can include downloading module dependencies based on module definition files 116 for modules 112 and invoking appropriate specific compiler 124 to emit source files 114 associated with modules 112. In some embodiments, planner 126 can use shallow module inspection or deep module inspection for buildless-capture. Shallow module inspection can be defined as using the presence of a module definition file on the disk to identify the presence of a module. In shallow module inspection, the content of the module definition file is ignored. Shallow module inspection can be contrasted with deep module inspection where the content of the module definition file is used during the capture process. In shallow module inspection, planner 126 may not retrieve contents in module definition file 116 for modules 112. Planner 126 may obtain information of modules 112 from the project directories.

In deep module inspection, planner 126 can retrieve information from module definition files 116 and produce an accurate model of modules 112. The retrieved information can include source files 114 associated with modules 112, module dependencies of modules 112, information about where and how to download missing dependencies, and information about how to invoke specific compiler 124 to emit modules 112. As discussed above, during observe phase 204 in FIG. 2, static analysis system 120 can scan the project directory to obtain a set of source files 114 and module definition files 116 associated with modules 112. With deep module inspection, planner 126 can refine the set of source files 114 based on the information in module definition files 116.

In some embodiments, planner 126 can retrieve missing dependencies for modules 112 in deep module inspection. Module dependencies of modules 112 can be important for static analysis of project artifacts 108. The dependency graph of modules 112 obtained from the project directory in observe phase 204 may not be accurate and complete. Planner 126 can retrieve module dependency information in module definition files 116 and download missing dependencies for modules 112. Planner 126 can update and refine the dependency graph of modules 112 with the dependency information in module definition files 116. In some embodiments, module definition files 114 can include additional information for emitting source files 114. For example, module definition files in a C#project can include target frameworks for emitting the C#project. With deep module inspection, static analysis system 120 can emit source files 114 based on the updated list of compiled source files 117, non-compiled source files 114, refined dependency graph, and additional information in module definition files 116.

Referring to FIG. 8A, after "capture compiled sources" state 806, planner 126 can generate actions to capture build outputs 115 for compiled source files 117 in "capture build outputs" state 808. In "capture non-compiled sources" state 810, planner 126 can generate actions to emit non-compiled source files 114 by invoking appropriate specific compiler 124 on source files 114. Unlike compiled source files 117, dependencies may not be required for non-compiled source files 114. Static analysis system 120 can capture non-compiled source files 114 without downloading dependencies or retrieving additional information from module definition files 116.

Referring to FIG. 8A, in "capture configuration files" state 812, planner 126 can generate actions to record relevant configuration files 118 associated with modules 112. Relevant configuration files 118 can be identified in observe phase 204. After "capture configuration files" state 812, state machine 800 can end in operation 814.

In some embodiments, planner 126 can associate a state machine for non-buildable modules 113 different from buildable modules 111. A non-buildable module may have no build command to compile source files associated with the module. Examples of non-buildable modules can be illustrated in Table 8 below:

TABLE 8

Example Non-Buildable Modules

| Module Type | Module File |
| --- | --- |
| NPM, Bower, Yarn | package.json |
| Python | requirements.txt or setup.py |
| PHP | composer.json |
| Ruby | .gemspec or Rakefile |

Figure 9:
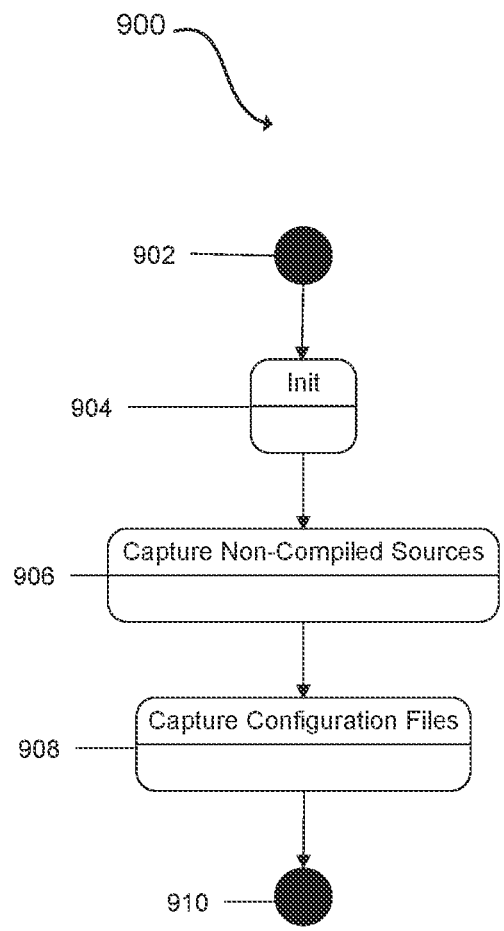
FIG. 9 illustrates capturing files with a state machine for a non-buildable module, in accordance with some embodiments of the present disclosure.

FIG. 9 illustrates capturing source files 114 for non-buildable modules 113 with a state machine 900, in accordance with some embodiments of the present disclosure. When capturing non-buildable modules 113, static analysis system 120 can capture files shown in Table 9 below:

TABLE 9

Files Captured during Capturing a Non-Buildable Module

| Files | Description |
| --- | --- |
| Non-Compiled Source Files | A non-buildable module can have non-compiled source files associated with it. |
| Configuration Files | Some non-buildable modules may have configuration files that are used to configure the runtime behavior of the modules. The static analysis can use the configuration files to better understand the modules. |

Referring to FIG. 9, after state machine 900 starts in operation 902, planner 126 can generate actions for internal setup in initialization state 904. In "capture non-compiled sources" state 906, planner 126 can generate actions to emit non-compiled source files 114. The actions can include invoking appropriate specific compiler 124 on source files 114. In some embodiments, planner 126 can generate actions for non-buildable modules 113 in "capture non-compiled sources" state 906 similar to "capture non-compiled sources" state 810 in FIG. 8A for buildable modules 111. Referring to FIG. 9, in "capture configuration files" state 908, planner 126 can generate actions to record relevant configuration files 118 associated with modules 112, similar to "capture configuration files" state 812 in FIG. 8A. Relevant configuration files 118 can be identified in observe phase 204. After "capture configuration files" state 908, state machine 900 can end in operation 910.

Referring to FIG. 2, execute phase 208 can receive outputs of plan phase 206, such as a sequence of actions, and executor 128 of static analysis system 120 can execute the sequence of actions to capture project artifacts 108. In some embodiments, when a fatal error occurs in execute phase 208 or plan phase 206 determines there are no more actions, the cycle of automatically capturing project artifacts 108 can terminate in operation 210. In some embodiments, the default build command may fail when executing build-capture to capture compiled source files 117 for buildable modules 111. The default build command may fail due to no build system on computer system 100 for the default build command or no access to required dependencies. In some embodiments, for a fatal error, executor 128 can terminate the capture process and static analysis system 120 may not capture any additional files in project artifacts 108 of the project. In some embodiments, for a regular error, executor 128 may ignore the regular error and continue the capture process. In some embodiments, in plan phase 206, generating actions can include criteria to determine whether an error is a fatal error or a regular error. For example, in "capture compiled sources" state 806, a regular error may occur when the default build command fails to capture a module with build-capture. Planner 126 may respond to the regular error by trying to capture the module with buildless-capture. In some embodiments, the regular error can be identified in observe phase 204 and planner 126 can be notified of the failure of capturing the module with build-capture. Observe phase 204 can update the capture status for source files associated with the module and planner 126 can generate additional actions for the module with buildless-capture.

Figure 10:
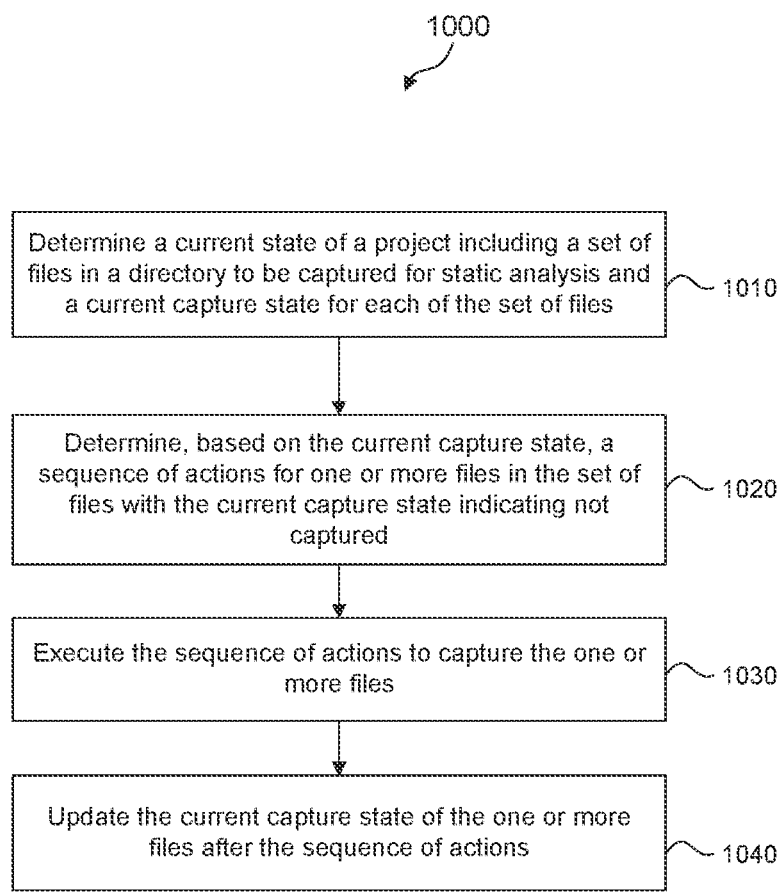
FIG. 10 illustrates a flowchart of a method for capturing source code and associated artifacts with both build-capture and buildless-capture, in accordance with some embodiments of the present disclosure.

FIG. 10 illustrates a flowchart of a method 1000 for capturing source code and associated artifacts with both build-capture and buildless-capture, in accordance with some embodiments of the present disclosure. Additional operations may be performed between various operations of method 1000 and may be omitted merely for clarity and ease of description. Additionally, some of the operations may be performed simultaneously, or in a different order than the ones shown in FIG. 10. Accordingly, it is understood that additional processes can be provided before, during, and/or after method 1000, and that these additional processes can be briefly described herein. For illustrative purposes, the operations illustrated in FIG. 10 can be described with reference to FIGS. 1-9.

Referring to FIG. 10, at 1010, a current state of a project is determined. The current state of the project includes a set of files in a directory to be captured for static analysis and a current capture status for each of the set of files. For example, as shown in FIGS. 1 and 2, static analysis system 120 can determine a current state of a project in observe phase 204. The current state of the project can include modules 112, compiled source files 117, non-compiled source files 114, module definition files 116, and configuration files 118 to be captured for static analysis and a current capture status for each file.

At 1020, a sequence of actions can be determined based on the current capture status for one or more files in the set of files with the current capture state indicating not captured. The sequence of actions includes capturing buildable modules in the one or more files with a build-capture based on a default build command and with a buildless-capture based on module definition files associated with the buildable modules and non-buildable modules. For example, as shown in FIGS. 1 and 2, planner 126 can determine a sequence of actions for buildable modules 111 and non-buildable modules 113 based on the current capture states for them. As shown in FIG. 8A in state machine 800, the sequence of actions can include capturing buildable modules 111 with a build-capture based on a default build command and with a buildless-capture based on module definition files 116 associated with buildable modules 111 and non-buildable modules 113.

At 1030, the sequence of actions can be executed to capture the one or more files. For example, as shown in FIGS. 1 and 2, executer 128 can execute the sequence of actions to capture modules 112, compiled source files 117, non-compiled source files 114, module definition files 116, and configuration files 118.

At 1040, the current capture status of the one or more files is updated after the sequence of actions. For example, as shown in FIGS. 1 and 2, static analysis system 120 can update the current capture status of modules 112, source files 114, module definition files 116, and configuration files 118 after execute phase 208 and feedback the information to observe phase 204.

In some embodiments, an example project can include files in a following example directory structure and automatically captured with method 1000. FIG. 5 shows the resulting module dependency graph and file associations, in accordance with some embodiments of the present disclosure.

/path/to/my-project/pom.xml
/path/to/my-project/module-A/pom.xml
/path/to/my-project/module-A/src/main/java/Class1.java
/path/to/my-project/module-A/src/main/java/Class2.java
/path/to/my-project/module-B/pom.xml
/path/to/my-project/module-B/src/main/java/Class3.java
/path/to/my-project/module-B/src/main/java/Class4.java
/path/to/my-project/module-B/src/main/java/Class5.java
/path/to/my-project/module-B/sub-module-B/pom.xml
/path/to/my-project/module-B/sub-module-B/src/main/java/Class6.java
/path/to/my-project/module-B/sub-module-B/src/main/java/Class7.java
/path/to/my-project/module-B/sub-module-B/src/main/resources/config1.properties
/path/to/my-project/module-B/sub-module-B/src/main/resources/config2.properties
/path/to/my-project/webapp/package.json
/path/to/my-project/webapp/src/file1.js
/path/to/my-project/webapp/src/file2.js
/path/to/my-project/webapp/src/file3.js In a first cycle of automatically capturing the example project, static analysis system 120 can obtain module dependency graphs 500 and 510 shown in FIG. 5 for the modules in the example project. The files in the example project may not be captured. Static analysis system 120 can input module dependency graphs 500 and 510 and the capture status for the files to planner 126. Planner 126 can process modules in the example project in a top-down order, as shown below:

pom.xml
module-A/pom.xml
module-B/pom.xml
module-B/sub-module-B/pom.xml
webapp/package.json When capturing module 502 "pom.xml," planner 126 can generate an action to use build-capture to capture top-level maven module 502 using an inferred default maven build command as below:

mvn-DskipTests-DskipITs-f pom.xml clean install

Figure 11:
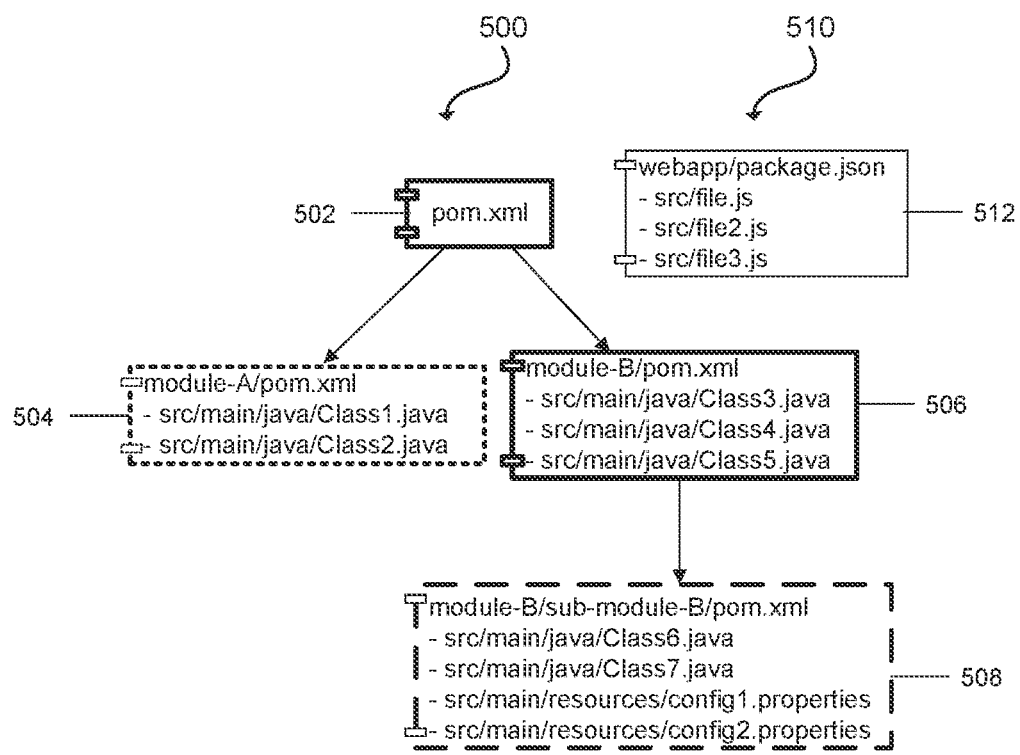
FIG. 11 illustrates an outcome of a module dependency graph after a cycle of automatically capturing source code, in accordance with some embodiments of the present disclosure.

After executing the default build command, the build system can attempt to build modules associated with top-level module 502, such as modules 504-508. In some embodiments, after executing the default build command, module 504 "module-A/pom.xml" may not be built and the Java source files in module 504 may be partially captured. Java source files in module 506 "module-B/pom.xml" may be completely captured. None of the Java source files in module 508 "module-B"module-B/sub-module-B/pom.xml" may be captured because the build system may not build module 508. FIG. 11 illustrates the outcomes after executing the default build command, in accordance with some embodiments of the present disclosure.

Referring to FIG. 11, in some embodiments, the line style of each module can indicate the capture status of each module. In some embodiments, a thick line can indicate a module captured successfully, a dotted line can indicate a module partially captured, a dashed line can indicate a module not captured, and a thin line can indicate no attempt to capture any files in a module in the current cycle. It is appreciated that the capture status of each module may be represented as a combination of line style and/or colors, without deviating from the scope of the present disclosure. As shown in FIG. 11, module 502 is captured, files associated with module 504 are partially captured, files associated with module 506 are all captured, files associated with module 508 are not captured, and module 512 is not considered for capture in the first cycle. The capture status for each source file can be summarized in FIG. 11 and Table 10 below:

TABLE 10

Capture Status of the Files in the Example Project after the First Cycle

| File | Capture Status |
| --- | --- |
| module-A/src/main/java/Class1.java | Captured |
| module-A/src/main/java/Class2.java | Not Captured |
| module-B/src/main/java/Class3.java | Captured |
| module-B/src/main/java/Class4.java | Captured |
| module-B/src/main/java/Class5.java | Captured |

TABLE 10-continued

Capture Status of the Files in the Example Project after the First Cycle

| File | Capture Status |
|---|---|
| module-B/sub-module-B/Class6.java | Not Captured |
| module-B/sub-module-B/Class7.java | Not Captured |
| module-B/sub-module-B/config1.properties | Not Captured |
| module-B/sub-module-B/config2.properties | Not Captured |
| webapp/src/file.js | Not Captured |
| webapp/src/file2.js | Not Captured |
| webapp/src/file3.js | Not Captured |

In some embodiments, planner 126 can take module dependency graphs 500 and 510 shown in FIG. 11 and capture status of the files in Table 10 as inputs for a second cycle of automatically capturing the example project. In the second cycle, planner 126 can continue generating actions to emit compiled source files, build outputs, non-compiled source files, and configurations files for each module of the example project in the top-down order. As top-level module 502 includes no source files, planner 126 can move on to process module 504 "module-A/pom.xml" in a top-down order. In some embodiments, planner 126 can invoke a completion check predicate for module 504. The completion check predicate can return false to indicate the capture status as incomplete for compiled source files of module 504. Planner 126 can generate an action to attempt build-capture on module 504. Since static analysis system 120 already attempted build-capture in the first cycle, no additional files of module 504 may be captured with build-capture.

Figure 12:
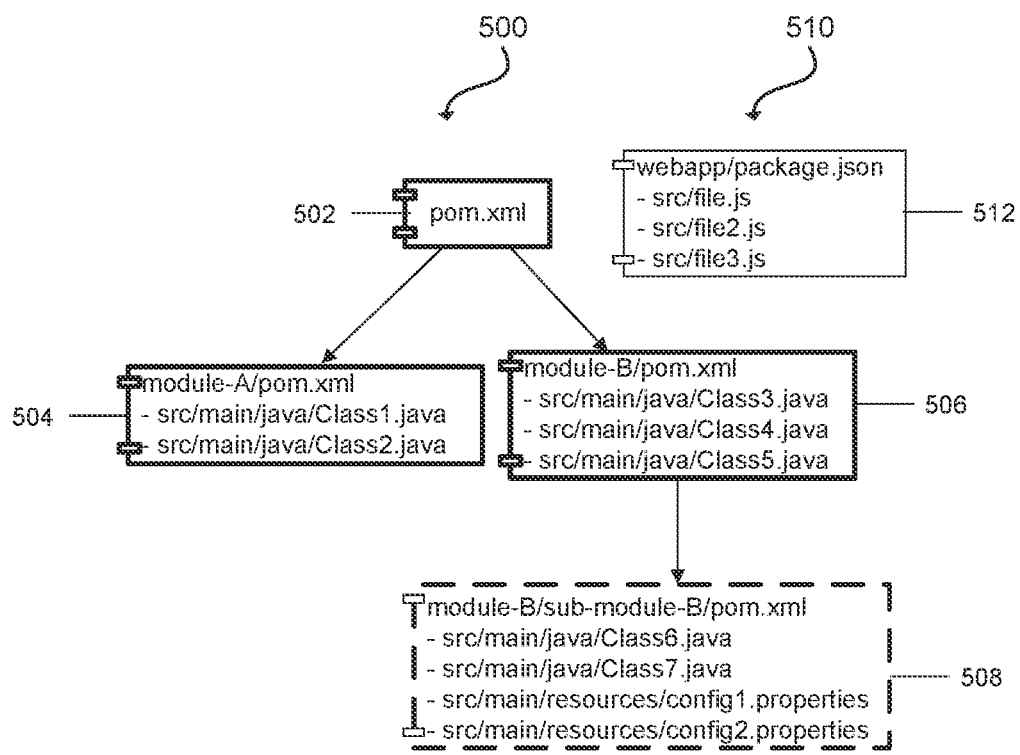
FIG. 12 illustrates inputs to an additional cycle of automatically capturing source code, in accordance with some embodiments of the present disclosure.

The state of the example project and the capture status of each file shown in Table 10 can be input into planner 126 for a third cycle. Planner 126 can attempt buildless-capture on module 504. After retrieving additional information from module definition files 116 associated with module 504, planner 126 can download any missing dependencies for module 504. Then planner 126 can generate an action to emit both source files "Class1.java" and "Class2.java" for module 504. After the third cycle, both source files of module 504 can be captured. In some embodiments, after the third cycle, the capture status for each file of the example project can be updated as shown in FIG. 12 and in Table 11 as below:

TABLE 11

Capture Status of the Files in the Example Project after the Third Cycle

| File | Capture Status |
|---|---|
| module-A/src/main/java/Class1.java | Captured |
| module-A/src/main/java/Class2.java | Captured |
| module-B/src/main/java/Class3.java | Captured |
| module-B/src/main/java/Class4.java | Captured |
| module-B/src/main/java/Class5.java | Captured |
| module-B/sub-module-B/Class6.java | Not Captured |
| module-B/sub-module-B/Class7.java | Not Captured |
| module-B/sub-module-B/config1.properties | Not Captured |
| module-B/sub-module-B/config2.properties | Not Captured |
| webapp/src/file.js | Not Captured |
| webapp/src/file2.js | Not Captured |
| webapp/src/file3.js | Not Captured |

In some embodiments, planner 126 can take module dependency graphs 500 and 510 shown in FIG. 12 and capture status of the files in Table 11 as inputs for a fourth cycle of automatically capturing the example project. Since static analysis system 120 has captured both compiled source files for module 504, the completion check predicate for module 504 can return true. Planner 126 can continue generating actions to capture build outputs, non-compiled source files, and configuration files for module 504. As module 504 has no additional files to capture shown in FIG. 12, planner 126 can move on to process module 506 in the top-down order. Planner 126 can invoke the completion check predicate on module 506. The completion check predicate can indicate that all compiled source files for module 506 have been captured according to Table 11. Then planner 126 can check if it needs to generate any actions to capture build outputs, non-compiled source files, and configuration files for module 506. As shown in FIG. 12 and Table 11, there may be no additional files in module 506 for capture. Planner 126 can move on to capture module 512 "web app/package.json."

In some embodiments, module 512 can be a non-buildable module. Planner 126 can generate an action to capture source files associated with module 512. The generated action can invoke specific compiler 124 such as a JavaScript compiler. Then planner 126 can check for additional files of module 512 to capture. As shown in FIG. 12 and Table 11, there may be no additional files in module 512 to capture. In some embodiments, the outputs of the fourth cycle can be shown in FIG. 13 and in Table 12 as below:

TABLE 12

Capture Status of the Files in the Example Project after the Fourth Cycle

| File | Capture Status |
|---|---|
| module-A/src/main/java/Class1.java | Captured |
| module-A/src/main/java/Class2.java | Captured |
| module-B/src/main/java/Class3.java | Captured |
| module-B/src/main/java/Class4.java | Captured |
| module-B/src/main/java/Class5.java | Captured |
| module-B/sub-module-B/Class6.java | Not Captured |
| module-B/sub-module-B/Class7.java | Not Captured |
| module-B/sub-module-B/config1.properties | Not Captured |
| module-B/sub-module-B/config2.properties | Not Captured |
| webapp/src/file.js | Captured |
| webapp/src/file2.js | Captured |
| webapp/src/file3.js | Captured |

Figure 13:
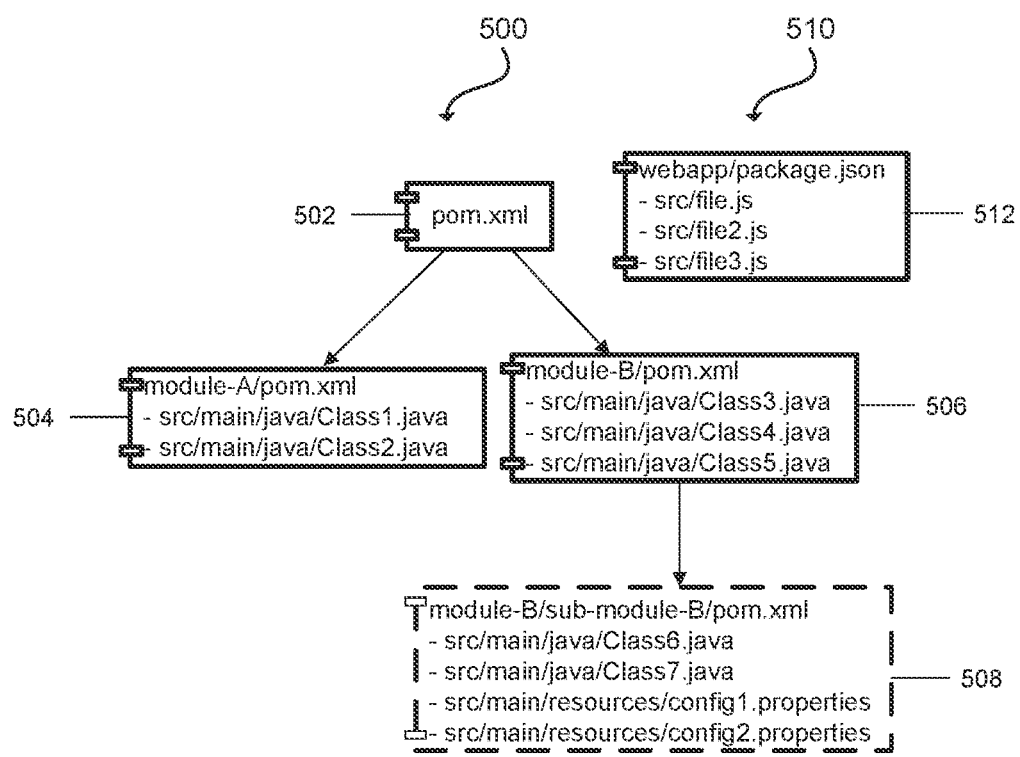
FIG. 13 illustrates inputs to an additional cycle of automatically capturing source code, in accordance with some embodiments of the present disclosure.

In some embodiments, planner 126 can take module dependency graphs 500 and 510 shown in FIG. 13 and capture status of the files in Table 12 as inputs for a fifth cycle of automatically capturing the example project. In the fifth cycle, planner 126 can process module 508 "module-B/sub-module-B/pom.xml." Planner 126 can invoke the completion check predicate for compiled source files associated with module 508. As module 508 may not be built with the default build command in the first cycle, the completion check predicate can return false. To capture the files for module 508, planner 126 can generate an action to attempt build-capture for module 508 using a default maven build command:

mvn-DskipTests-DskipITs-fmodule-B/sub-module-B/pom.xm clean install

Figure 14:
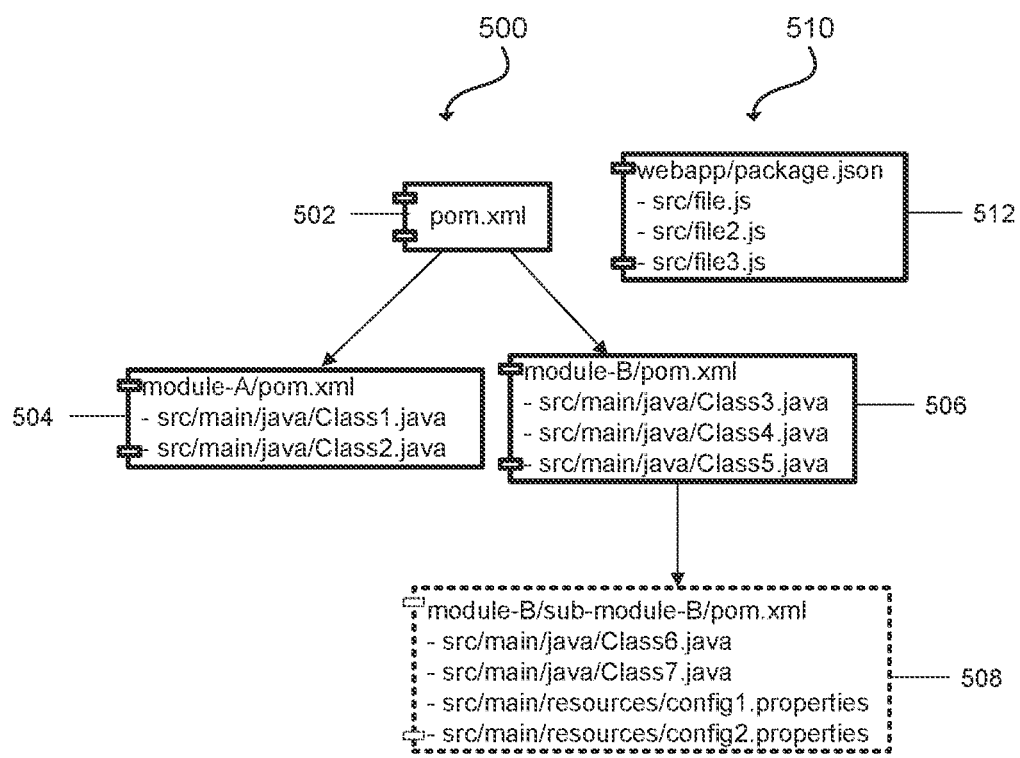
FIG. 14 illustrates inputs to an additional cycle of automatically capturing source code, in accordance with some embodiments of the present disclosure.

In some embodiments, the default build command can capture the source files associated with module 508 and module 508 can produce a web application archive called "webapp.war" in a target directory for module 508, for example, "target/webapp.war." In some embodiments, after the fifth cycle, the capture status for each file of the example project can be updated as shown in FIG. 14 and in Table 13 as below:

TABLE 13

Capture Status of the Files in the Example Project after the Fifth Cycle

| File | Capture Status |
|---|---|
| module-A/src/main/java/Class1.java | Captured |
| module-A/src/main/java/Class2.java | Captured |
| module-B/src/main/java/Class3.java | Captured |
| module-B/src/main/java/Class4.java | Captured |
| module-B/src/main/java/Class5.java | Captured |
| module-B/sub-module-B/Class6.java | Captured |
| module-B/sub-module-B/Class7.java | Captured |
| module-B/sub-module-B/config1.properties | Not Captured |
| module-B/sub-module-B/config2.properties | Not Captured |
| module-B/sub-module-B/target/webapp.war | Not Captured |
| webapp/src/file1.js | Captured |
| webapp/src/file2.js | Captured |
| webapp/src/file3.js | Captured |

In some embodiments, planner 126 can take module dependency graphs 500 and 510 shown in FIG. 14 and capture status of the files in Table 13 as inputs for a sixth cycle of automatically capturing the example project.

Referring to FIG. 8A, for buildable module 508 after "capture compiled sources" state 806, static analysis system 120 can capture build outputs in next "capture build outputs" state 808. Planner 126 can check the files in the example project determined in observe phase 204 and can notice the build output of "target/webapp.war." Then planner 126 can generate an action to capture the build output "target/webapp.war" and executor 128 can execute the action in the sixth cycle.

Figure 15:
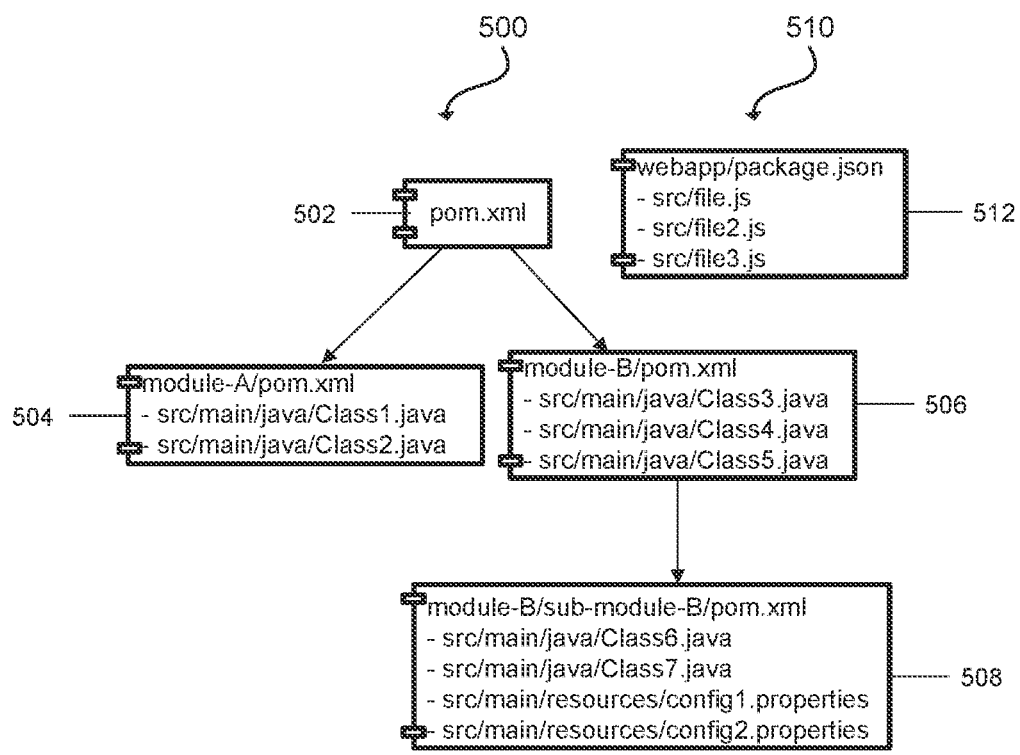
FIG. 15 illustrates inputs to an additional cycle of automatically capturing source code, in accordance with some embodiments of the present disclosure.

In a seventh cycle, static analysis system 120 can capture configurations files of module 508 according to next "capture configuration files" state 812 shown in FIG. 8A. Two configuration files "src/main/resources/config1.properties" and "src/main/resources/config2.properties" can be identified in observe phase 204. Planner 126 can generate an action for executor 128 to capture both configuration files. In some embodiments, after the seventh cycle, the capture status for each file of the example project can be updated as shown in FIG. 15 and in Table 14 as below:

TABLE 14

Capture Status of the Files in the Example Project after the Seventh Cycle

| File | Capture Status |
|---|---|
| module-A/src/main/java/Class1.java | Captured |
| module-A/src/main/java/Class2.java | Captured |
| module-B/src/main/java/Class3.java | Captured |
| module-B/src/main/java/Class4.java | Captured |
| module-B/src/main/java/Class5.java | Captured |
| module-B/sub-module-B/Class6.java | Captured |
| module-B/sub-module-B/Class7.java | Captured |
| module-B/sub-module-B/config1.properties | Captured |
| module-B/sub-module-B/config2.properties | Captured |
| module-B/sub-module-B/target/webapp.war | Captured |
| webapp/src/file1.js | Captured |
| webapp/src/file2.js | Captured |
| webapp/src/file3.js | Captured |

In some embodiments, planner 126 can take module dependency graphs 500 and 510 shown in FIG. 15 and capture status of the files in Table 14 as inputs for an eighth cycle of automatically capturing the example project. As shown in FIG. 15 and Table 13, all the modules and associated files in the example project can be captured and planner 126 may generate no additional actions. Static analysis system 120 can end the process of automatically capturing the example project according to FIG. 2.

The embodiments provided by the disclosure can automatically capture source code of a project for static analysis with a build-capture based on a default build command and with a buildless-capture based on module definition files. In some embodiments, a user may not be required to supply a build command or install specific build systems and compilers to capture the source code.

According to some embodiments of this disclosure, static analysis system 120 can capture source code of a project and improve fidelity of generated ASTs for the source code. In some embodiments, static analysis system 120 can generate ASTs for the source code with missing dependencies and malformed code. The embodiments described in this disclosure can reduce time and cost to capture the source code of the project for static analysis.

Figure 16:
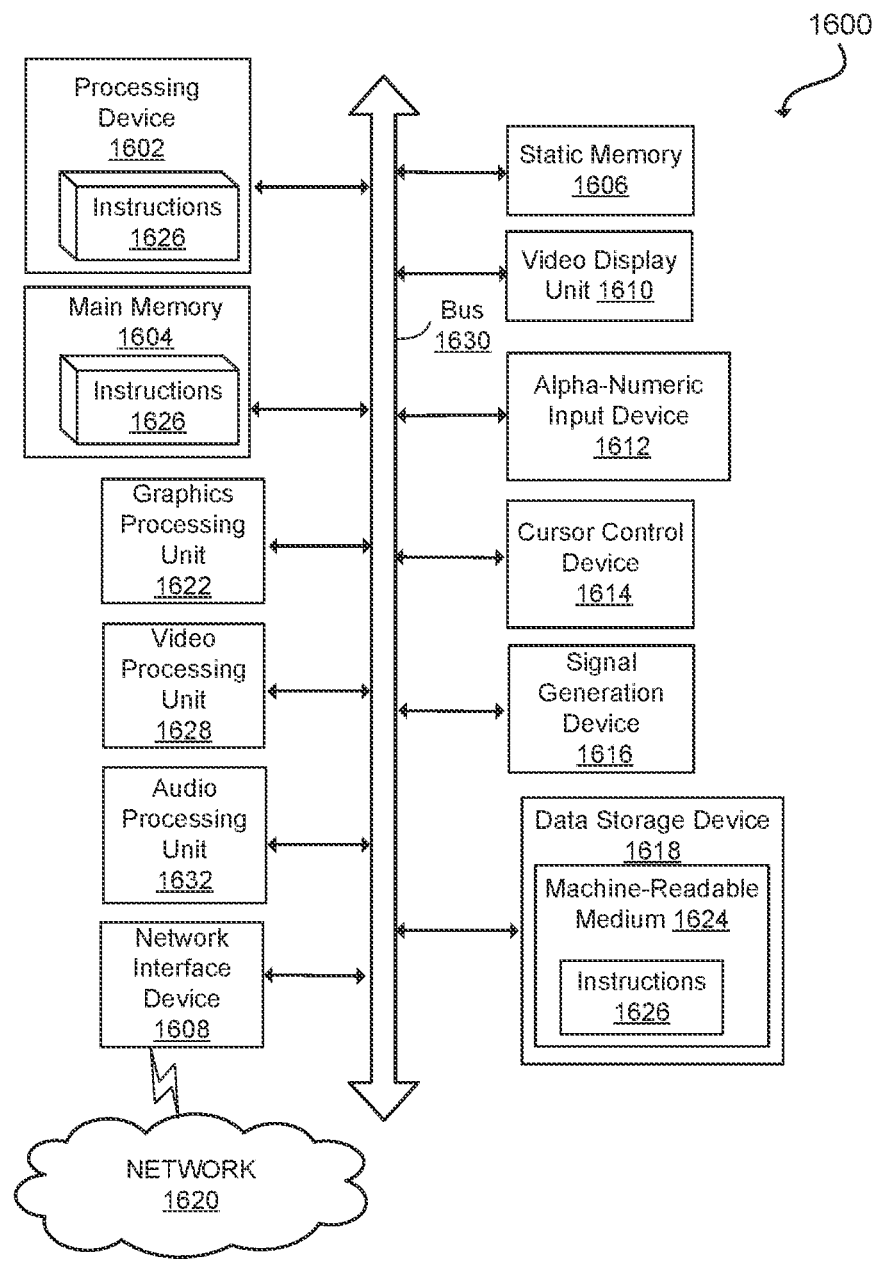
FIG. 16 depicts a diagram of an example computer system in which embodiments of the present disclosure may operate.

FIG. 16 illustrates an example machine of a computer system 1600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM) such as synchronous DRAM (SDRAM), a static memory 1606 (e.g., flash memory, static random access memory (SRAM), etc.), and a data storage device 1618, which communicate with each other via a bus 1630.

Processing device 1602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1602 may also be one or more special-purpose processing devices such as an application specific integrated circuit (ASIC), a field programmable gate array (FPGA), a digital signal processor (DSP), network processor, or the like. The processing device 1602 may be configured to execute instructions 1626 for performing the operations and steps described herein.

The computer system 1600 may further include a network interface device 1608 to communicate over the network 1620. The computer system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), a graphics processing unit 1622, a signal generation device 1616 (e.g., a speaker), graphics processing unit 1622, video processing unit 1628, and audio processing unit 1632.

The data storage device 1618 may include a machine-readable storage medium 1624 (also known as a non-transitory computer-readable medium) on which is stored one or more sets of instructions 1626 or software embodying any one or more of the methodologies or functions described herein. The instructions 1626 may also reside, completely or at least partially, within the main memory 1604 and/or within the processing device 1602 during execution thereof by the computer system 1600, the main memory 1604 and the processing device 1602 also constituting machine-readable storage media.

In some implementations, the instructions 1626 include instructions to implement functionality corresponding to the present disclosure. While the machine-readable storage medium 1624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    determining a current state of a project using static analysis, wherein the current state of the project comprises a current capture status of a set of files in a directory, wherein the set of files comprises a subset of compiled source files, wherein the current capture status is based on a set of capture statuses corresponding to each file of the set of files, and wherein each file of the set of files comprises a buildable module configured to generate a build output through a build process with a build command;
    determining, by a processor, whether to translate a first file of the set of files based on the current capture status;
    translating, through a capture process, a first buildable module of the first file of the set of files into a first representation with a build-capture based on an inferred build command, wherein translating a first compiled source file of the subset of compiled source files is based on a hierarchy of a dependency graph for build modules; and
    capturing the first representation as a translated file of the set of files.

2. The method of claim 1, wherein determining the current state of the project comprises:
    determining the dependency graph for modules in the set of files based on a directory structure of the modules; and
    associating source files in the set of files with the modules based on the directory structure.

3. The method of claim 2, wherein translating the first buildable module comprises:
  in response to not capturing the compiled source files in the build-capture, refining the dependency graph and the compiled source files associated with the first buildable module based on module definition files for the first buildable module;
  translating the compiled source files associated with the first buildable module with a buildless-capture using the refined dependency graph; and
  translating non-compiled source files of the set of files and configuration files of the set of files associated with the first buildable module.

4. The method of claim 1, further comprising capturing non-compiled source files of the set of files and configuration files of the set of files associated with a first non-buildable module in the first file of the set of files with a buildless-capture.

5. The method of claim 1, further comprising updating the current capture status of the set of files.

6. The method of claim 1, wherein translating the first buildable module with the build-capture comprises inferring a default build command based on a module type of the first buildable module.

7. The method of claim 1, wherein each file of the set of files is captured.

8. A system, comprising:
  a memory storing instructions; and
  at least one processor coupled with the memory to execute the instructions, the instructions when executed cause the processor to:
    determine a current state of a project using static analysis, wherein the current state of the project comprises a current capture status for a set of files in a directory, wherein the set of files comprises a subset of compiled source files, wherein the current capture status is based on a set of capture statuses corresponding to each file of the set of files, and wherein each file of the set of files comprises a buildable module configured to generate a build output through a build process with a build command;
    determine whether to translate a first file of the set of files based on the current capture status;
    translate, through a capture process, a first buildable module of the first file of the set of files into a first representation with a build-capture based on an inferred build command, wherein translating the subset of compiled source files is based on a hierarchy of a dependency graph; and
    capture the first representation as a translated file of the set of files.

9. The system of claim 8, wherein determining the current state of the project comprises:
  determining the dependency graph for modules in the set of files based on a directory structure of the modules; and
  associating source files in the set of files with the modules based on the directory structure.

10. The system of claim 9, wherein translating the first buildable module comprises:
  in response to not capturing the compiled source files by in the build-capture, refining the dependency graph and the compiled source files associated with the first buildable module based on module definition files for the first buildable module;
  translating the compiled source files associated with the first buildable module with a buildless-capture using the refined dependency graph; and
  translating non-compiled source files of the set of files and configuration files of the set of files associated with the first buildable module.

11. The system of claim 8, wherein the processor further captures non-compiled source files of the set of files and configuration files of the set of files associated with a first non-buildable module in the first file of the set of files with a buildless-capture.

12. The system of claim 8, wherein the processor further updates the current capture status of the set of files.

13. The system of claim 8, wherein translating the first buildable module with the build-capture comprises inferring a default build command based on a module type of the first buildable module.

14. The system of claim 8, wherein each file of the set of files is captured.

15. A non-transitory computer-readable storage medium storing instructions that, when executed by at least one processor, cause the at least one processor to:
  determine a current state of a project using static analysis, wherein the current state of the project comprises a current capture status for a set of files in a directory, wherein the set of files comprises a subset of compiled source files, wherein the current capture status is based on a set of capture statuses corresponding to each file of the set of files, and wherein each file of the set of files comprises a buildable module configured to generate a build output through a build process with a build command;
  determine whether to translate a first file of the set of files based on the current capture status;
  translate, through a capture process, a first buildable module of the first file of the set of files into a first representation with a buildless-capture based on a module definition file associated with the first buildable module, wherein translating a first compiled source file of the subset of compiled source files is based on a hierarchy of a dependency graph for build modules; and
  capture the first representation as a translated file of the set of files.

16. The non-transitory computer-readable storage medium of claim 15, wherein determining the current state of the project comprises:
  determining the dependency graph for modules in the set of files based on a directory structure of the modules; and
  associating source files in the set of files with the modules based on the directory structure.

17. The non-transitory computer-readable storage medium of claim 16, wherein translating the first buildable module comprises:
  in response to not capturing the compiled source files in the buildless-capture, refining the dependency graph and the compiled source files associated with the first buildable module based on module definition files for the first buildable module;
  translating the compiled source files associated with the first buildable module with the buildless-capture using the refined dependency graph; and
  translating non-compiled source files of the set of files and configuration files of the set of files associated with the first buildable module.

18. The non-transitory computer-readable storage medium of claim 15, wherein the processor further captures non-compiled source files of the set of files and configuration files of the set of files associated with a first non-buildable module in the first file of the set of files with the buildless-capture.

19. The non-transitory computer-readable storage medium of claim 15, wherein the processor further updates the current capture status of the set of files.

20. The non-transitory computer-readable storage medium of claim 15, wherein translating the first buildable module comprises inferring a default build command as the build command based on a module type of the first buildable module.

* * * * *